US008585802B2

(12) United States Patent
Keller

(10) Patent No.: US 8,585,802 B2
(45) Date of Patent: Nov. 19, 2013

(54) CARBON DIOXIDE CAPTURE AND LIQUEFACTION

(76) Inventor: Arnold Keller, Henderson, NV (US)

( * ) Notice: Subject to any disclaimer, the term of this patent is extended or adjusted under 35 U.S.C. 154(b) by 251 days.

(21) Appl. No.: 13/178,273

(22) Filed: Jul. 7, 2011

(65) Prior Publication Data

US 2012/0006054 A1 Jan. 12, 2012

Related U.S. Application Data

(60) Provisional application No. 61/362,968, filed on Jul. 9, 2010.

(51) Int. Cl.
*F25J 3/08* (2006.01)

(52) U.S. Cl.
USPC .................. 95/45; 95/139; 95/236; 423/220; 423/226; 62/618; 62/620; 62/637

(58) Field of Classification Search
USPC ........ 95/45, 90, 139, 149, 236; 423/220, 226, 423/228, 229, 230; 62/602, 617–620, 637
See application file for complete search history.

(56) References Cited

U.S. PATENT DOCUMENTS

| | | | | |
|---|---|---|---|---|
| 2,649,166 | A | | 8/1953 | Porter et al. |
| 2,863,527 | A | | 12/1958 | Herbert et al. |
| 3,362,133 | A | | 1/1968 | Kutsher et al. |
| 3,614,872 | A | | 10/1971 | Tassoney et al. |
| 3,737,392 | A | | 6/1973 | Ameen |
| 4,152,129 | A | | 5/1979 | Trentham et al. |
| 4,270,937 | A | | 6/1981 | Adler et al. |
| 4,370,156 | A | | 1/1983 | Goddin, Jr. et al. |
| 4,533,372 | A | | 8/1985 | Valencia et al. |
| 4,561,869 | A | | 12/1985 | Gazzi et al. |
| 4,576,615 | A | | 3/1986 | Netzer et al. |
| 4,609,388 | A | * | 9/1986 | Adler et al. .................... 62/632 |
| 4,654,062 | A | | 3/1987 | Gottier |
| 4,704,146 | A | * | 11/1987 | Markbreiter et al. ........... 62/625 |
| 4,762,543 | A | * | 8/1988 | Pantermuehl et al. .......... 62/625 |
| 4,923,493 | A | | 5/1990 | Valencia et al. |
| 5,062,270 | A | | 11/1991 | Haut et al. |
| 5,120,338 | A | | 6/1992 | Potts, Jr. et al. |

(Continued)

FOREIGN PATENT DOCUMENTS

| | | | |
|---|---|---|---|
| GB | 2457950 A | | 2/2009 |
| WO | WO 02/064238 | | 8/2002 |

(Continued)

OTHER PUBLICATIONS

Giampaolo Manfrida, Including CO2 Removal in Power Plants, Dipartminento di Energetica "Sergio Stecco", 1999, pp. 1-27, Università di Firenze, Italy.

(Continued)

*Primary Examiner* — Frank Lawrence, Jr.
(74) *Attorney, Agent, or Firm* — Hovey Williams LLP

(57) ABSTRACT

An energy-efficient method of recovering carbon dioxide ($CO_2$) in a high-pressure liquid state from a high-pressure gas stream. The method includes cooling, condensing, and/or separating $CO_2$ from a high-pressure gas stream in two or more separation zones and further purifying the resulting sub-critical pressure liquid $CO_2$ streams in a third purification zone to thereby provide purified $CO_2$. The purified liquid $CO_2$ may be pumped to above the critical pressure for further utilization and/or sequestration for industrial or environmental purposes.

25 Claims, 9 Drawing Sheets

(56) References Cited

U.S. PATENT DOCUMENTS

| | | | | |
|---|---|---|---|---|
| 5,185,139 | A | 2/1993 | Krishnamurthy et al. | |
| 5,724,805 | A | 3/1998 | Golomb et al. | |
| 5,819,555 | A | 10/1998 | Engdahl | |
| 6,301,927 | B1 | 10/2001 | Reddy | |
| 6,477,859 | B2 | 11/2002 | Wong et al. | |
| 6,497,852 | B2 | 12/2002 | Chakravarti et al. | |
| 6,632,266 | B2 | 10/2003 | Thomas et al. | |
| 6,662,589 | B1 * | 12/2003 | Roberts et al. | 62/425 |
| 6,974,496 | B2 | 12/2005 | Wegeng et al. | |
| 7,294,327 | B2 | 11/2007 | McClanahan et al. | |
| 7,314,503 | B2 | 1/2008 | Landrum et al. | |
| 7,731,782 | B2 | 6/2010 | Kelley et al. | |
| 7,964,025 | B2 * | 6/2011 | Zhang et al. | 95/181 |
| 8,231,709 | B2 * | 7/2012 | Marty et al. | 95/45 |
| 2006/0260189 | A1 | 11/2006 | Reddy et al. | |
| 2007/0232706 | A1 | 10/2007 | Shah et al. | |
| 2009/0101007 | A1 * | 4/2009 | Find | 95/42 |
| 2009/0101012 | A1 | 4/2009 | Gal et al. | |
| 2009/0232861 | A1 | 9/2009 | Wright et al. | |
| 2009/0301108 | A1 | 12/2009 | Hees | |
| 2010/0024471 | A1 | 2/2010 | Hees et al. | |
| 2010/0050687 | A1 | 3/2010 | Hees | |
| 2010/0064889 | A1 | 3/2010 | Gal | |
| 2011/0011128 | A1 * | 1/2011 | Grover | 62/617 |

FOREIGN PATENT DOCUMENTS

| | | | |
|---|---|---|---|
| WO | WO 02/064238 | A1 | 8/2002 |
| WO | WO 2008/017783 | A2 * | 2/2008 |
| WO | WO 2009/046721 | A1 * | 4/2009 |

OTHER PUBLICATIONS

Maysar Adams and Leo Bonnell, Purification of CO2 for Sequestration and Low Emissions Venting, Presented to Gasification Technologies Conference, Oct. 6, 2009, pp. 1-11, SNC—Lavalin.

Rapid Cycle Pressure Swing Adsorption (RCPSA)—A New Commercialized Process for Lower Cost H2 Recovery, Exxon Mobil Research and Engineering, QuestAir Pure Innovations, pp. 1-4, Fairfax, VA.

U.S. Department of Energy, Cost and Performance Baseline for Fossil Energy Plants vol. 1: Bituminous Coal and Natural Gas to Electricity, National Energy Technology Laboratory, Revision 2, Nov. 2010, pp. 194-225.

U.S. Department of Energy, Fossil Energy Power Plant Desk Reference, Bituminous Coal and Natural Gas to Electricity Summary Sheets, May 2007, 5 pages.

* cited by examiner

CARBON DIOXIDE CAPTURE AND LIQUEFACTION

CROSS-REFERENCE TO RELATED APPLICATIONS

This application claims benefit under 35 U.S.C. §119(e) based on U.S. Provisional Application No. 61/362,968, filed on Jul. 9, 2010, the entire disclosure of which is incorporated herein by reference.

FIELD OF THE INVENTION

This invention generally relates to methods of removing carbon dioxide from a high-pressure gas stream substantially free from water vapor and sulfur compounds and recovering the high-pressure substantially pure liquefied carbon dioxide for further use, processing, and/or storage.

BACKGROUND

There is current interest in capturing carbon dioxide ($CO_2$) from industrial processes and sequestering (or storing) the captured $CO_2$ in a way to prevent $CO_2$ gas from entering the atmosphere. The product of combustion in the manufacture of power and in other combustion processes results in the emission of $CO_2$ to the atmosphere. These $CO_2$ emissions are believed by some scientists to contribute to global warming. As a result, $CO_2$ is considered to be a Green House Gas (GHG).

Carbon dioxide sequestration is achieved by capturing the $CO_2$, and storing it once captured, before it has a chance to enter the atmosphere. The U.S. Government may soon seek to minimize $CO_2$ emissions by promulgating legislation to enact a "Cap-and-Trade" system, or by other means, such as an EPA edict. The European Union (EU) and other developed countries have already (or are about to) enact similar legislation to regulate the amount of GHG emissions.

The current methods available for capturing $CO_2$ are varied. Regardless of the specific method used, the captured $CO_2$ needs to be purified in order to meet the required standards for safe pipeline transmission and injection to the subsurface, wherein it can be sequestered (stored) for eternity. Until now, there has been no economic incentive to capture and sequester $CO_2$, and, therefore, there has been little incentive to develop the technology necessary to carry out this sequestration step. With the impending legislation in the US and abroad, there will soon be an economic disruption to the status quo of simply discharging $CO_2$ to the atmosphere.

For several years, there has been a debate on the impact of GHG on global warming, and at various times, individuals and companies have explored, through studies, the economic consequences of having to capture and sequester the $CO_2$ released during the combustion process. The studies utilized existing technologies, and then applied an "add-on" technology to treat the captured $CO_2$ to make it suitable for sequestration at supercritical pressure, such as, for example, to prepare it for subsurface injection in various suitable geological formations. The studies demonstrated that the consequence of $CO_2$ sequestration have added a considerable economic penalty with regard to energy production costs in the form of additional capital expenditures and increased operating costs.

The United States Department of Energy (U.S. DOE) has been at the forefront of commissioning studies and has embarked on sponsoring several research and development (R&D) programs intended to look for the most economic means for producing power, while sequestering $CO_2$. These programs are seeking new technology designed to have the lowest impact on cost of power to the U.S. industrial and residential consumer. In the studies focusing on various sequestration processes proposed to-date, the $CO_2$ stream could be collected prior to venting, and next compressed in a multistage $CO_2$ compressor to the specified super critical pressure. The compressed $CO_2$ would then be sent via pipeline to the $CO_2$ capture site for injection, typically under supercritical conditions, in the targeted geological formation.

For example, in power generation applications, recovery and capture of $CO_2$ from these processes is desirable. As an example, the synthesis gas created in a high-pressure coal (or coke or biomass) gasifier comprises substantial amounts of carbon monoxide (CO). Conventionally, the synthesis gas is subjected to a number of steps, including gas cooling, gas scrubbing to remove chlorides, and reaction of the scrubbed gas and with steam in one or more CO-Shift reactors where the CO is converted into hydrogen and $CO_2$ according to the following "CO-Shift Reaction" equilibrium reaction: $CO+H_2O{=}CO_2+H_2$ (exothermic reaction).

Ideally, most of the CO can be converted to $CO_2$ and captured, pre-combustion. The resultant synthesis gas stream, prior to capture, can contain approximately 50% $CO_2$ (on a dry basis). Unfortunately, this stream typically also contains $H_2S$ and COS, both of which are undesirable constituents. Conventional removal technologies, such as RECTISOL and SELEXOL employ physical solvents such as methanol or dimethyl ether of polyethylene glycol (DEPG) to achieve the removal of $H_2S$ and $CO_2$ through proprietary processes. Other proprietary processes, such as MORPHYSORB and PURISOL also employ physical solvents to remove $H_2S$ and capture $CO_2$. Generally speaking, the above-mentioned processes each achieve the sequential removal of sulfur-containing constituents followed by the removal of the $CO_2$ using a common solvent. The recovered stream containing the sulfur constituents is routed for processing (e.g., in a Claus plant), or a sulfuric acid manufacturing plant while the recovered $CO_2$ stream, free from any sulfur-containing constituent, is vented to atmosphere.

There are differences in the current physical solvent processes that result in differences in both the capital and operating cost. However, each of these processes suffers from a common drawback: each process regenerates its solvent by releasing the entire amount of captured $CO_2$ at relatively low pressures. This common problem results in the energy requirement to compress the entire captured $CO_2$ from approximately atmospheric pressure to a super critical pressure needed for sequestration. There are variations in each of the process configurations that partially mitigate these problems by releasing some of the $CO_2$ at modest pressure, but the majority of the $CO_2$ is still released at close to atmospheric pressure. As a result, the overall cost of equipment and energy required for the $CO_2$ compression (and subsequent purification) is a major cost burden on the current $CO_2$ capture-compression processes.

Thus, a need exists for an alternative approach for capturing $CO_2$ from a high-pressure gas stream. The approach should be applicable to a wide variety of processes and conditions, including, but not limited to, high-pressure synthesis gas and/or high-pressure natural gas originating from a variety of process or natural sources and locations. The approach should be both energy efficient and cost-effective, both in terms of capital and operating costs.

SUMMARY OF THE INVENTION

One embodiment of the present invention concerns a method of recovering carbon dioxide ($CO_2$) in a liquid state from a high-pressure gas stream. The method comprises cooling and partially condensing a high-pressure gas feed stream to thereby provide a first condensed $CO_2$-rich fraction and an uncondensed $CO_2$-lean fraction. The method comprises recovering a $CO_2$-rich liquid stream from the uncondensed $CO_2$-lean fraction wherein the recovering comprises one or more of the following steps: (1) adsorbing $CO_2$ from the uncondensed $CO_2$-lean fraction; (2) absorbing $CO_2$ from the uncondensed $CO_2$-lean fraction; and/or (3) freezing $CO_2$ from the uncondensed $CO_2$-lean fraction. The method comprises combining at least a portion of the $CO_2$-rich liquid stream with at least a portion of the condensed $CO_2$-rich fraction to thereby provide a combined $CO_2$-rich stream and fractionating at least a portion of the combined $CO_2$-rich stream in a purification zone to remove non-$CO_2$ components therefrom and thereby provide a purified $CO_2$-rich liquid stream. The high-pressure feed gas stream has a pressure of at least 60.4 psia and the purified $CO_2$-rich liquid stream has a pressure of at least 100 psia. The condensed $CO_2$-rich fraction and the combined $CO_2$-rich stream are liquid streams.

Another embodiment of the present invention concerns a method of recovering carbon dioxide ($CO_2$) in a liquid state from a high-pressure gas stream. The method comprises cooling and partially condensing a high-pressure feed gas stream to thereby provide a condensed $CO_2$-rich fraction and an uncondensed $CO_2$-lean fraction. The method comprises recovering a $CO_2$-rich liquid stream from at least a portion of the uncondensed $CO_2$-lean fraction, wherein the recovering comprises one or more of the following steps: (1) absorbing $CO_2$ from the uncondensed $CO_2$-lean fraction, and/or (2) adsorbing $CO_2$ from the uncondensed $CO_2$-lean fraction, and/or (3) freezing $CO_2$ from the uncondensed $CO_2$-lean fraction. The method comprises introducing at least a portion of the $CO_2$-rich liquid stream recovered in step (b) and/or at least a portion of the condensed $CO_2$-rich fraction resulting from the cooling and partially condensing of step (a) into a purification zone and separating at least a portion of the non-$CO_2$ components from the $CO_2$-rich liquid stream and/or the condensed $CO_2$-rich fraction introduced into the purification zone to thereby provide a purified $CO_2$-rich liquid stream. Each of the high-pressure feed gas stream, the condensed $CO_2$-rich fraction, and the purified $CO_2$-rich liquid stream has a pressure greater than 77 psia.

Carbon dioxide recovery processes and systems configured according to one or more embodiments of the present invention can comprise a first separation zone, for removing $CO_2$ from a substantially dry and nearly sulfur compound-free high pressure feed gas stream and a second separation zone for further separating $CO_2$ from the remaining feed gas stream by adsorbing, absorbing, or solidifying by freezing at least a portion of the $CO_2$ remaining in the feed gas stream. The processes and systems of the present invention can be more efficient, and thereby provide a bigger economic advantage, than conventional $CO_2$ capture and removal systems and processes. Processes and systems as described herein can minimize energy consumption by maintaining the pressure of one or more of the feed gas stream, the recovered, purified $CO_2$ liquid stream, and/or one or more interim process streams (e.g., the condensed $CO_2$-rich fraction withdrawn from the first separation zone and the $CO_2$-rich liquid stream exiting the second separation zone) at a pressure greater than 77, 100, 500, or 650 psia. In another embodiment, the pressure of one or more of these streams can be at a pressure greater than the triple point pressure of $CO_2$ (e.g., 77 psia), and/or at a pressure in the range of 77 to 1070 psia, 640 to 1016 psia, or 700 to 910 psia.

BRIEF DESCRIPTION OF THE DRAWINGS

Various embodiments of the present invention are described in detail below with reference to the attached drawing figures, wherein.

Figure 1:
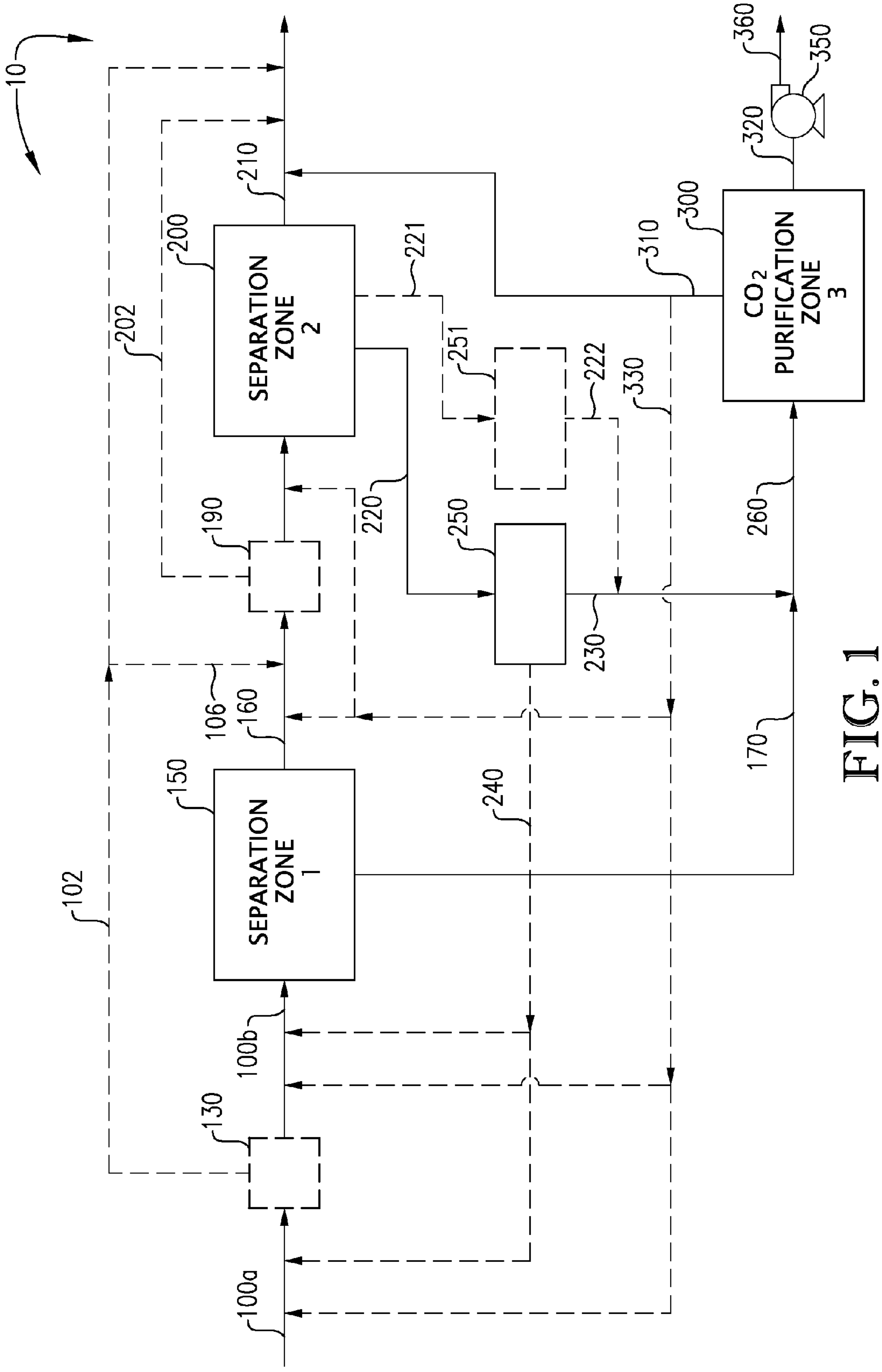
FIG. 1 is a schematic overview of a $CO_2$ recovery facility configured according to various embodiments of the present invention.

A more detailed description of various embodiments of the present invention will now be discussed herein with reference to the foregoing drawings. The following description is to be taken by way of illustration and not undue limitation.

DETAILED DESCRIPTION

In accordance with one or more embodiments of the present invention, a process to capture carbon dioxide ($CO_2$) from a substantially dry, low sulfur high-pressure hydrocarbon gas stream is provided. The resultant $CO_2$-depleted hydrocarbon stream can be substantially free of $CO_2$ and the recovered $CO_2$ stream, which comprises or consists essentially of purified $CO_2$ at a pressure near, at, or above supercritical pressure, can be utilized in a variety of applications (e.g., Enhanced Oil Recovery) or sequestered (e.g., stored) indefinitely.

In one embodiment of the present invention, a $CO_2$ recovery facility can comprise a first separation step operable to cool a high-pressure gas stream to thereby condense at least a portion of the $CO_2$ therefrom. The resulting uncondensed $CO_2$-lean gas stream can then be subjected to a second separation step or stage, wherein additional $CO_2$ is removed via adsorption, absorption, and/or freezing. Various embodiments of second stage recovery processes that utilize $CO_2$ adsorption, absorption, or freezing are illustrated in and described shortly with respect to FIGS. 4*a* and 4*b*, 5*a* and 5*b*, 6*a* and 6*b*. At least a portion of the condensed $CO_2$-rich fraction withdrawn from the first separation stage and at least a portion of the $CO_2$-rich liquid stream exiting the second separation stage can be combined and further processed (e.g., fractionated) to produce a high-pressure but sub-critical purified $CO_2$ liquid stream, which can then be pumped to above critical pressure and utilized or stored as described above.

According to one or more embodiments of the present invention, at least a portion of the $CO_2$ recovery in the second separation zone can be carried out by (1) adsorbing $CO_2$ from the uncondensed $CO_2$-lean fraction; (2) adsorbing $CO_2$ from the uncondensed $CO_2$-lean fraction, and/or; (3) freezing $CO_2$ from the uncondensed $CO_2$-lean fraction. When the recovery process employed in the second stage includes adsorption or absorption, the resulting $CO_2$ vapor stream can be compressed, cooled and condensed to result in a high-pressure $CO_2$-rich liquid stream. This stream can then be combined with the $CO_2$-rich fraction withdrawn from the first separation stage. When the recovery process employed in the second stage includes freezing, the resulting $CO_2$ solids can be melted and the resulting $CO_2$-rich liquid can be combined with the $CO_2$-rich fraction withdrawn from the first separation stage. Aspects and variations of these embodiments can be described in more detail shortly.

The $CO_2$ recovery processes described herein can be operable to recover, in the purified liquid $CO_2$ stream withdrawn from the final separation stage, between 75 and 99 percent or at least about 75, 90, 95, or 99 percent of the $CO_2$ originally present in the high-pressure feed gas stream. At the same time, these processes and systems can achieve the above-described capture of $CO_2$ with substantially lower energy usage than many conventional and current $CO_2$ separation or recovery technologies. At least a portion of this energy savings can be attributed to the fact that at least a portion (or a substantial portion) of the volume of the recovered $CO_2$ may not be subjected to the energy penalty associated with the recompression of $CO_2$. As used herein, the term "compression" is defined as increasing the pressure of a gas or vapor stream. In one embodiment, no more than 90, 80, 50, 25, or 10 percent of the $CO_2$ present in the final purified $CO_2$-rich liquid stream was subjected to compression during the recovery process employed in second separation zone 200.

Referring initially to FIG. 1, one embodiment of a CO2 recovery facility is schematically shown as comprising a first separation zone 150, a second separation zone 200, and a third separation or purification zone 300. Depending on the concentration of $CO_2$ and the pressure of the feed gas, the percentage recovery of $CO_2$ that can be recovered in first separation zone 150 can be in the range of between 10 to 95 percent (See FIG. 3). The balance of non-condensed $CO_2$ can then be subjected to additional processing in the second separation zone 200, wherein the $CO_2$ can be recovered via (1) adsorption, (2) absorption, or (3) solidification by freezing. Following the recovery of at least some of the $CO_2$ in the second separation zone, the $CO_2$ can then be liquefied by compression and cooling, in the case of (1) adsorption or (2) absorption, or by melting in the case of freezing. In all cases, the rich $CO_2$ liquid streams captured from first and second separation zones 150, 200 can be combined and purified in third separation zone 300. Optionally, one or more enrichment zones illustrated here as first enrichment zone 130 and second enrichment zone 190, can be utilized to enrich the $CO_2$ content of the gas streams entering first and second separation zones 150, 200. Additional details regarding the configuration and operation of $CO_2$ recovery facility 10 can be described shortly.

Carbon dioxide recovery facility 10 can be operable to remove or capture $CO_2$ from a variety of different types of high-pressure gas streams. In one embodiment, the high-pressure feed gas streams processed in recovery facility 10 can have a pressure of at least 60.4, 61, 77, 350, or 5,000 psia. For example, the high-pressure gas or feed gas streams introduced into the first separation zone 150 via conduits 100A and optional enrichment zone 130 can comprise between 10 and 95 or at least 5, 10, 20, 30, 40, 50, 60, 70, 80, 90, or 95 mole percent $CO_2$. Suitable types of feed gas streams can include sources of both natural and synthetic (e.g., synthesis) gases originating from a variety of different sources. Additional details regarding specific applications will be discussed in detail shortly.

Gas streams processed according to embodiments of the present invention can include one or more suitable non-$CO_2$ compounds in the range of 5 to 90 mole percent or not more than 95, 90, 80, 70, 60, 50, 40, 30, 20, 10, or 5 mole percent of the feed gas stream. As used herein, the term "non-$CO_2$ compound" is any chemical component that is not carbon dioxide. Some non-$CO_2$ compounds can be "suitable" non-$CO_2$ compounds, while other non-$CO_2$ compounds can be "unsuitable" non-$CO_2$ compounds. Examples of suitable non-$CO_2$ component can include any component or material having a normal average boiling point (nabp) of cooler than −110° F. One exception is ethane whose normal boiling point (nbp) is −127.5° F. However, ethane cannot be considered a suitable non-$CO_2$ component, as it tends to form an azeotropic mixture with $CO_2$. Examples of suitable non-$CO_2$ components that can be present in the high-pressure gas stream processed by $CO_2$ recovery facility 10 are summarized in Table 1A, below.

TABLE 1A

Examples of Suitable non-$CO_2$ Gas Components

| Component | Normal Boiling Point (° F.) |
|---|---|
| Hydrogen | −423 |
| Methane | −259 |
| Nitrogen | −320 |
| Carbon Monoxide | −313 |
| Oxygen | −297 |

Non-$CO_2$ compounds having a boiling point greater (e.g. warmer) than −110° F. are unsuitable for processing in the $CO_2$ facilities as described herein and can typically be present in the high-pressure gas stream in only small amounts. If any unsuitable non-$CO_2$ gas components are present in the feed gas, these components can be removed via one or more appropriate state-of-the-art pre-treatment processes (not shown) prior to introducing the feed gas into first separation zone 150. Examples of unsuitable non-CO2 components are provided in Table 1B, below.

TABLE 1B

Examples of Un-Suitable non-$CO_2$ Gas Components

| Component | Normal Boiling Point (° F.) |
|---|---|
| all Alkanes (except $CH_4$) | various |
| Hydrogen Sulfide | −76 |
| Sulfur Dioxide | +14 |
| Carbonyl Sulfide | −59 |
| Water | +212 |

Figure 2:
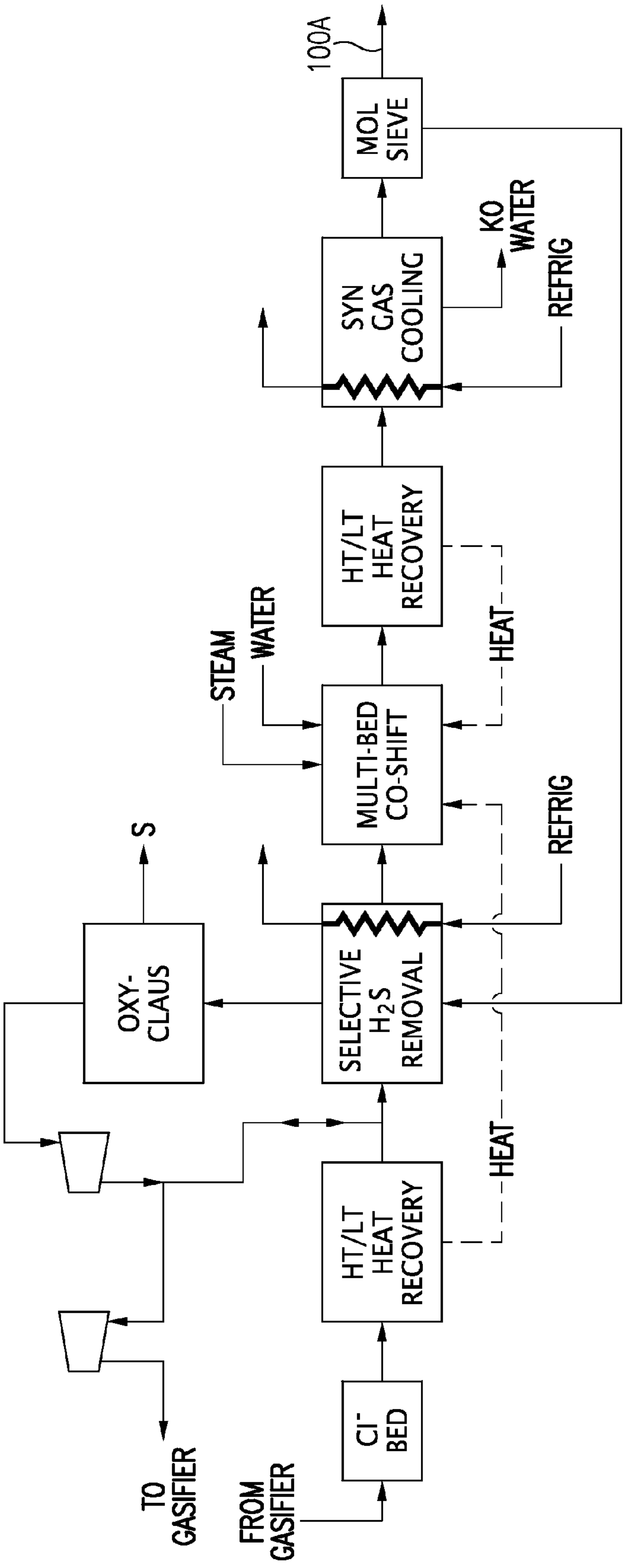
FIG. 2 is a schematic flow diagram of one example process with a feed treatment zone suitable to be located upstream of the basic $CO_2$ recovery facility shown in FIG. 1.

Turning now to FIG. 2, one example of a possible arrangement for treating the high pressure gas stream upstream of the recovery facility shown in FIG. 1 is illustrated. The system depicted in FIG. 2 shows how a synthesis gas stream from a coal or coke gasifier can be treated. These steps may include: chloride removal, high temp/low temp (HT/LT) recovery, selective HS removal in, for example a SELEXOL (or DEPG) plant, or potentially a selective amine plant utilizing an amine such as MDEA. The $H_2S$, if selectively removed, could be sent for sulfur recovery such as a Claus or oxy-Claus unit, or instead to a sulfuric acid manufacturing plant. The gas, which has been treated to remove substantially all of the $H_2S$, can then be treated in a conventional multi-bed CO-shift plant to shift some, or most, of the CO to $CO_2$ in the WG shift reaction: $CO+H_20=CO_2+H_2$ (exothermic). Following CO shift, further HT/LT heat recovery is required. Additional cooling and water condensation results in a water saturated gas at about 45° F. Final water and any residual sulfur compounds can be removed in a molecular sieve contact bed.

After exiting the example pretreatment process, potential arrangement of which is illustrated in FIG. 2, the pretreated gas in conduit 100A or 100B (if optional device 130 is not used) can be sent to the $CO_2$ recovery facility 10 shown in FIG. 1, specific embodiments and variations of which can be described in detail shortly. The pretreated gas can be substantially free from non-methane hydrocarbons, sulfur compounds, and water vapor prior to being introduced into recovery facility 10 shown in FIG. 1.

Figure 3:
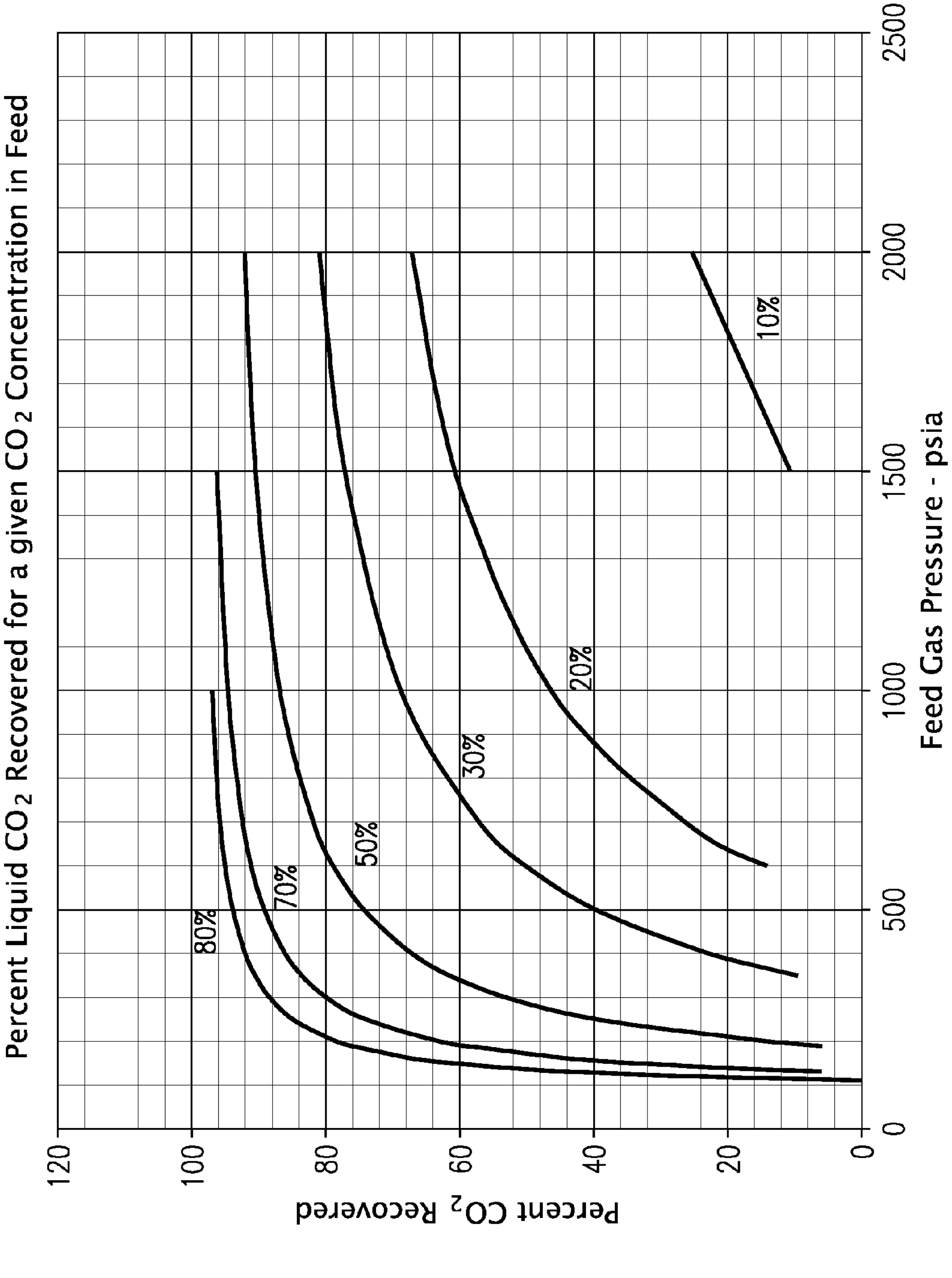
FIG. 3 is a graph showing the theoretical percent $CO_2$ recovery in conduit 170 due to cooling and condensation from feed gases having different concentration levels of $CO_2$ and different pressures available in the first separation zone 150 of the recovery facility shown in FIG. 1.

Referring now to FIG. 3, a graphical representation of the relationship between feed gas pressure and $CO_2$ recovery, following cooling and condensation for various levels (e.g., volume percents) of $CO_2$ in the feed gas, is provided. FIG. 3 assumes a gaseous mixture of suitable non-$CO_2$ components (in any combination of concentration) and an amount of $CO_2$, as indicated by each of the six lines of constant $CO_2$ concentration. For example, the uppermost line represents expected $CO_2$ recoveries at given feed gas pressures for a gas mixture comprising 80 percent (by volume) $CO_2$ and 20 percent of a suitable non-$CO_2$ gas components. Similarly, the lowermost line corresponds to various expected $CO_2$ recovery percents as a function of feed gas pressure of a mixture of 10 volume percent $CO_2$ and 90 percent of one or more suitable non-$CO_2$ gas components.

It may be desirable to remove as much of the $CO_2$ from the feed gas stream as possible by condensation in first separation zone 150. As evidenced by FIG. 3, the higher the feed gas concentration in $CO_2$ and the higher the pressure of the feed gas, the more $CO_2$ can be condensed in the first separation zone. Conversely, lower levels of $CO_2$ concentration and/or lower feed gas pressures reduces the amount of $CO_2$ that will condense in the first separation zone 150. A plant-by-plant economic analysis may provide additional guidance regarding specific operating conditions for implementing embodiments of the present invention to cost effectively achieve bulk $CO_2$ capture in liquid form.

In one embodiment depicted in FIG. 1, one or more $CO_2$ enrichment zones (e.g., zones 130 and/or 190) can be located upstream of first and/or second separation zones 150, 200 to thereby increase the concentration of $CO_2$ in the incoming (feed) gas streams. Use of one or more enrichment zones may be advantageous when, for example, the high-pressure gas stream in conduit 100A of the $CO_2$ recovery facility illustrated in FIG. 1 comprises less than 30, 20, 10, or 5 mole percent $CO_2$. In another embodiment, one or more enrichment zones can be useful when, for example, there is a sufficient pressure differential between the high-pressure feed gas stream and the desired pressure of the final $CO_2$-depleted gas stream withdrawn from second separation zone 200 in conduit 210.

As shown in FIG. 1, when an enrichment zone is utilized upstream of first separation zone 150, the high-pressure gas stream, which can have a pressure of at least 61, 77 350, or 5,000 psia, in conduit 100A can be passed through first enrichment zone 130 prior to entering first separation zone 150. First enrichment zone 130 can be any process or step operable to remove at least a portion of the non-$CO_2$ components, thereby enriching the high-pressure feed gas in $CO_2$ concentration. The first enrichment zone 130 can comprise at least one membrane separation device (not shown) and can be operable to remove a first permeate stream 102 from the high-pressure gas stream passing therethrough. When two or more membrane separators are utilized, the separators can be arranged in series and/or parallel and can, in some embodiments, utilize at least a portion of the surplus energy. In the absence of any surplus energy, the enrichment zone 130 can use a compressor to boost the pressure upstream of the membrane to increase the diffusion driving force through the membrane(s). As a result, a higher pressure non-permeate gas stream can enter first separation zone 150, which can result in a pressure in conduit 170 greater than 77 psia.

At least one membrane separation device can be operable to allow hydrogen to preferentially permeate, by diffusion, through the membrane(s). The hydrogen-rich permeate can be at a substantially lower pressure than the high-pressure feed gas stream, while the pressure difference between the feed gas and the non-permeate stream can be relatively insignificant. By employing a method of partial hydrogen removal via the peiineate stream (conduit 102) effectively increases the concentration of $CO_2$ in the non-permeate stream (conduit 100B). This will improve the effectiveness of the current invention. Additional compression upstream of the membrane separators within enrichment zone 130, if utilized, could add further benefit, as the gas entering conduit 100B can be both more concentrated in $CO_2$ and also at a higher pressure compared to the gas in 100A. Both effects may be desirable outcomes to improve the amount of $CO_2$ that can be successfully condensed in separation zone 150 (via conduit 170), as illustrated in FIG. 3.

According to one embodiment illustrated in FIG. 1, at least a portion of first permeate stream 102 can be routed around the cooling step of first separation zone 150. Optionally, the portion of the first permeate stream 102 bypassing first separation zone 150 can be combined in conduit 106 with at least a portion of the uncondensed $CO_2$-lean fraction exiting first separation zone and the combined stream can be passed via conduit 160 into second separation zone 200. In addition or in the alternative, the portion of the first permeate stream bypassing first separation zone 150 can be combined with the $CO_2$-depleted product gas stream withdrawn from second separation zone 200 in conduit 210. The amount of the first permeate stream bypassing first and/or second separation zones 150, 200 depends, in part, on the composition, the pressure and the rate of the feed gas stream, as well as the desired compositions and rates of the $CO_2$-depleted product gas stream and the purified liquid $CO_2$ stream exiting $CO_2$ recovery facility 10.

After pretreatment and optional $CO_2$-enrichment, the high-pressure gas stream in conduit 100B can comprise not more than about 50, 25, 20, or 1 ppmv of water. Typically, the amount of sulfur compounds can be limited to local governmental environmental permit restraints on the final disposition of gas stream leaving 210, and to the ultimate disposition to the atmosphere following (for example) combination in a gas turbine exhausting to the atmosphere. In one embodiment, the high pressure gas stream in conduit 100B can comprise less than 10, 1, or 0.1 mole percent of one or more sulfur-containing compounds. The concentration of $CO_2$ in conduit 100B can be in the range of in between 10 percent and 95 percent, while the pressure can be greater than 277 psia to allow for an approximately 200 psi pressure drop and the resultant $CO_2$ product above its triple point pressure of 77 psia. Temperature of the stream 100B can typically be between 33° F. and 125° F., depending, in part, on the specific configuration of the pretreatment processes employed upstream of the invention. Even higher temperatures can be achieved when at least one booster compressor is utilized in enrichment zone 130.

The high-pressure feed gas stream in conduit 100B can then be introduced into first separation zone 150, wherein the feed gas stream can be cooled and at least partially condensed to thereby provide a condensed $CO_2$-rich fraction in conduit 170 and an uncondensed $CO_2$-lean fraction in conduit 160. Both product streams 160 and 170 exiting first separation zone 150 can be maintained at relatively high-pressures within about 5 to 200 psia, or within 5, 50, or 200 psia of the pressure feed gas stream in conduit 100B. In one embodiment, the pressure of the liquid condensed $CO_2$-rich fraction can be at least 77, 650, or 1,070 psia, while the pressure of the uncondensed $CO_2$-rich fraction in conduit 160 can be at least 60.4, 350, or 5,000 psia. First separation zone 150 can be operable to cause between 10 and 99 or at least 10, 50, or 99 percent of the $CO_2$ originally present in feed gas stream in conduit 100B to condense. Thus, the condensed $CO_2$-rich fraction withdrawn from first separation zone 150 via conduit 170 can comprise of between 10 and 99 percent or at least 10, 50, or 90 percent of the total $CO_2$ present in the high-pressure feed gas stream present at conduit 100B, while the uncondensed $CO_2$-lean fraction will contain the balance of $CO_2$ of the total $CO_2$ originally present in the feed gas stream introduced into first separation zone 150, via conduit 100B. The uncondensed $CO_2$-lean fraction can comprise less than 80, 50, or 10 percent of the total $CO_2$ originally present in the high pressure feed gas stream.

According to one or more embodiments of the present invention, first separation zone can remove a portion of the $CO_2$ from the high-pressure feed gas stream, while leaving other non-$CO_2$ components (such as, for example, one or more compounds identified in Table 1A) in the uncondensed $CO_2$-lean fraction exiting first separation zone 150 via conduit 160. For example, the uncondensed $CO_2$-lean fraction exiting first separation zone 150 via conduit 160 can comprise at least 50, 70, 75, 95, 99 or 100 percent of the total non-$CO_2$ components originally present in the high-pressure feed gas stream introduced into first separation zone 150. As a result, the condensed $CO_2$-rich fraction can include very small amount of these components, such as, for example, less than 50, 20, or 1 percent of the total amount of non-$CO_2$ components originally present in the high-pressure feed gas stream introduced into conduit 150. Consequently, first separation zone can be capable of producing a high-purity condensed $CO_2$-rich fraction comprising at least 50, 60, 70, 80, 90, or 99 mole percent $CO_2$, while the uncondensed $CO_2$-lean fraction (e.g., the treated feed gas stream) can comprise less than 50, 40, 30, 20, 10, 5, or 1 mole percent $CO_2$.

First separation zone 150 can employ any suitable method for cooling and condensing at least a portion of the $CO_2$ from the incoming gas stream, as described above. The first separation zone 150 can employ a plurality (e.g., one or more) heat exchangers wherein the feed gas can be sequentially cooled to a temperature warmer than −69.8° F. or warmer than the freezing point of $CO_2$ (e.g., −69.8° F.). Prevention of cold spots in the final heat exchanger is desirable in order to prevent the possibility of solid $CO_2$ forming and plugging the heat exchanger equipment. The temperature of condensed $CO_2$-rich fraction in conduit 170 can be warmer than about −69.8 F and the temperature of the uncondensed $CO_2$-fraction in conduit 160 can be in the range from −69.8° F. to ambient temperature, depending on the extent of cold temperature heat recovery.

At least a portion of the heat recovered from one heat exchange stage can be used in one or more other heat exchange stages of first separation zone 150. For example, since the high-pressure gas cooling can be achieved in a plurality of heat exchangers, at least a portion of the cooling energy can be recovered via one or more back heat exchangers. Use of back heat exchange can minimize the number of progressively cooler refrigeration stages and increase overall efficiency. The condensed $CO_2$-rich fraction withdrawn from first separation zone 150 via conduit 170 and/or the uncondensed $CO_2$-lean fraction exiting first separation zone 150 via conduit 160 can be used to provide cooling to one or more streams within first separation zone 150. Both product streams can be maintained at high-pressure, while allowing for typical pressure drop through the various pieces of equipment. At some point, the liquid $CO_2$ stream can be pumped to a higher pressure in order to extract more cooling effect from the liquid $CO_2$, while preventing the $CO_2$ stream from vaporizing. The final (e.g., warmest) temperature the liquid $CO_2$ stream can reach is the bubble point of the liquid stream. The bubble point temperature is a limit of the amount of cooling available from the separated crude $CO_2$ stream as it is desirable to prevent the $CO_2$ from flashing. The high-pressure gas stream can be unlimited in how much cooling effect it can surrender to the incoming warm hydrocarbon feed gas, other than through limitations dictated by the temperature driving forces need to encourage the flow of heat through the heat exchanger(s).

As the $CO_2$ condenses out of the feed gas stream in first separation zone 150, the liquefied $CO_2$ may be intermittently separated in one or more phase separator vessels prior to reaching a final phase separator. The first separation zone can include one separator, two or up to 10 or more separator vessels. According to one embodiment, two, three, or four separator vessels can be utilized to economically remove the liquefied carbon dioxide.

At least a portion of the cooling provided in first separation zone 150 can be provided by indirectly heat exchanging at least a portion of the feed gas stream with one or more refrigerants. The cooling provided in first separation zone 150 can be at least partially, substantially, or entirely provided by a cascade refrigeration system, a mixed refrigerant refrigeration system, or other less conventional refrigeration systems (e.g., absorption refrigeration and/or acoustic refrigeration). As used herein, the term "cascade refrigeration system" refers to a refrigeration system employing a plurality of refrigeration cycles, each employing a different pure component refrigerant to successively cool the incoming gas stream. A mixed refrigerant refrigeration system employs a mixture of refrigerants comprising a plurality of different suitable refrigerant components. Cascade refrigeration systems as described herein typically employ two different refrigerants in a plurality of different stages operable to cool the feed gas stream from an ambient temperature down to a temperature not cooler than the freezing point of $CO_2$ in a series of discrete steps. Cascade refrigeration systems suitable for use in first separation zone 150 can comprise a plurality of refrigeration stages employing, as an example, a predominantly-propane refrigerant, a predominantly-propylene refrigerant, a predominantly-ammonia refrigerant, a predominantly-ethane refrigerant, and/or a predominantly-ethylene refrigerant. Each of the refrigeration cycles typically operate in a closed-loop cycle and can be arranged in a suitable order needed to match the temperature cooling profile of the feed gases.

Referring back to FIG. 1, the uncondensed $CO_2$-lean concentration, which comprises $CO_2$ in the range of from 10 to 80 percent can be withdrawn from first separation zone 150 via conduit 160 and routed to second separation zone 200. When the $CO_2$ content of the uncondensed $CO_2$-lean fraction is about 30 mole percent or less, it may be desirable to pass the stream through a second enrichment zone, depicted as optional second enrichment zone 190 in FIG. 1, to thereby remove a second permeate stream in conduit 202 and increase the concentration of $CO_2$ in the non-permeate stream. Second enrichment zone 190, when present, can include another set of at least one membrane separator operable to remove a second, hydrogen-rich permeate stream from the uncondensed $CO_2$-lean fraction, thereby providing a $CO_2$-concentrated non-permeate stream, which can subsequently be routed to second separation zone 200. As shown in FIG. 1, the second permeate stream in conduit 202 can be bypassed around second separation zone 200 and can optionally be combined with a portion of the $CO_2$-depleted vapor stream withdrawn from second separation zone 200 in conduit 210.

Turning now to second separation zone 200, any suitable means for recovering additional carbon dioxide from the uncondensed $CO_2$-lean stream can be employed. As examples, a $CO_2$-rich liquid stream can be recovered from the uncondensed $CO_2$-lean fraction in the second separation zone by utilizing one or more of the following steps: (1) adsorbing $CO_2$ from the uncondensed $CO_2$-lean fraction; (2) absorbing $CO_2$ from the uncondensed $CO_2$-lean fraction; and/or (3) deliberately freezing $CO_2$ from the uncondensed $CO_2$-lean fraction. The second separation step can be operated to recover and condense at least 5, 50, 70, or 80 or up to 99 percent of the total $CO_2$ originally present in the uncondensed $CO_2$-lean fraction in conduit 160, while retaining more than 50, 70, 80, 90, or 99 percent of non-$CO_2$ components originally present in the uncondensed $CO_2$-lean fraction in conduit 210. The resulting liquid $CO_2$-rich liquid stream exiting second separation zone 200 via conduit 230 can have a pressure of at least 77, 650, or 1070 psia or 100 or 200 psig, and can typically comprise at least 50, 60, 70, 80, 90, 95, or 100 or between 90 and 100 mole percent $CO_2$.

When the recovering step employed in second separation zone 200 comprises adsorbing and/or absorbing $CO_2$ from the uncondensed $CO_2$-lean fraction, the adsorption and/or absorption step can produce a $CO_2$-rich gaseous stream having a pressure less than the pressure of the high-pressure feed gas. The $CO_2$-rich gas stream can subsequently be compressed and/or cooled to produce a liquid stream in liquefaction stage 250 to thereby provide a $CO_2$-rich liquid stream in conduit 230. The pressure of the $CO_2$-rich liquid stream in conduit 230 can be adjusted, by pump, to a pressure that is substantially the same as the pressure of the condensed $CO_2$-rich fraction in conduit 170 such that at least a portion of the two streams can be combined in conduit 260, as shown in FIG. 1. In the event that the pressure of the $CO_2$-rich stream in conduit 230 is higher, after compression, than the pressure of the $CO_2$-rich stream in conduit 170, the adjustment in pressure of the $CO_2$-rich liquid stream can be made on the stream in conduit 170 by pumping to enable the combining of the two liquid streams in conduits 230 and 170 without danger of flashing either of the $CO_2$-rich liquid streams in conduit 260. The combined $CO_2$-rich liquid stream in conduit 260, which has a pressure of at least 77, 500, or 750 psia and/or not more than 1,070 psia, can then be fractionated, distilled, or otherwise separated in third separation zone (e.g., $CO_2$ purification zone) 300 to remove most residual non-$CO_2$ components and thereby provide a purified $CO_2$-rich liquid stream in conduit 320 having a pressure of at least 77, 100, or 750 psia and/or not more than 1,070 psia. The desired final pressure of the purified liquid can be achieved using a pump 350, located downstream of purification zone 300. Additional details regarding third separation zone 300 will be discussed shortly.

In one or more embodiments of the present invention, second separation zone 200 can be operated such that the pressure drop (e.g., pressure loss) of the captured or recovered $CO_2$ can be minimized. In one embodiment, the selection and operation of specific recovery processes (e.g., adsorption, absorption, and/or freezing) can be carried out to achieve this or other objectives, including, for example, capital and operating cost optimization. Details regarding various embodiments of each type of recovery process listed above will now be discussed below.

According to one embodiment of the present invention, at least a portion of the $CO_2$ recovered in second separation zone 200 can be adsorbed from the incoming uncondensed $CO_2$-lean gas stream. Adsorption can comprise removing at least a portion of the incoming $CO_2$ with one or more types of solid adsorbents. The adsorption method generally includes passing a gas stream comprising uncondensed $CO_2$ through a Pressure Swing Adsorber (PSA) or other device to affect the removal of $CO_2$ via the adsorption mechanism.

When the adsorption step includes a PSA, any suitable PSA equivalent technology can be employed to adsorb at least a portion of the uncondensed $CO_2$, including, for example, a Pressure Swing Adsorber (PSA), a Rapid Cycle Pressure Swing Adsorber (RCPSA), and/or Rapid Cycle Thermal Adsorber (RCTSA). The former two processes typically regenerate solid adsorbent via pressure let down, while the latter utilizes thermal methods of regeneration. Regardless of the type of adsorption equipment or process utilized, the adsorption step can produce a $CO_2$-rich tail gas stream. In addition to the $CO_2$ recovered from the incoming gas stream, the tail gas comprises other non-hydrogen constituents removed by adsorption on to the bed material and then they are released during the depressurization step of the PSA process.

In one embodiment, the pressure of the tail gas stream can be about 0.25 times the absolute pressure of the uncondensed $CO_2$-lean gas stream introduced into the adsorption zone. While, in another embodiment, the pressure of the tail gas stream can be in the range of 5 to 120 psia, or 20 to 100 psia, or less than 50 psia. The $CO_2$-rich tail gas stream can be further compressed and cooled in a liquefaction stage, thereby condensing at least a portion of the $CO_2$ from the tail gas stream in conduit 230. Alternatively the compressed, but not condensed, tail gas stream in conduit 240 can be recycled from the compressor in unit 250 and subsequently combined with at least a portion of the high-pressure gas stream in conduit 100A and/or the high-pressure feed gas stream in conduit 100B, as shown in FIG. 1 for cooling and condensing in first separation zone 150.

Any method of adsorption which allows for the $CO_2$ to be released from the adsorbent, preferably at a higher pressure than that stated above, could be advantageous. One embodiment wherein the $CO_2$-depleted tail gas is not recycled to first separation zone 150 is illustrated, by example, in FIGS. 4*a* and 4*b*, described in detail shortly. Turning back to FIG. 1, when an adsorption step is utilized in second separation zone 200 to recover at least a portion of the $CO_2$, at least a portion of the compressed, partially-cooled tail gas stream in conduit 240 can be recycled to combine with the feed gas stream in conduits 100A and/or 100B. While this method may result in potentially higher energy costs, fewer items of equipment may be needed, resulting in a lower capital expenditure.

When a PSA unit is employed in second separation zone 200 to adsorb practically all of the $CO_2$ from the uncondensed $CO_2$-lean stream, and the compressed tail gas can be recycled to first separation zone 150, the recycle can be operated to minimize the buildup of certain constituents in the recycle loop. Conventional PSA units typically allow an essentially pure hydrogen stream to exit from the PSA, while capturing essentially all the other non-hydrogen constituents. In one embodiment, the PSA employed in second separation zone 200 can permit at least a portion of the non-hydrogen constituents to pass through PSA uncaptured to thereby concentrate the $CO_2$ in the tail gas rather than discharge the $CO_2$ in the stream captured on the PSA bed, which comprises mostly non-hydrogen constituents. In one embodiment, the adsorption system comprises an additional mechanism for purging, in a slip stream, non-hydrogen and/or non-$CO_2$ constituents (e.g., nitrogen, carbon monoxide, and methane), which will otherwise have no means to exit the recycle loop. These non-hydrogen and non-$CO_2$ components can be purged from the recycle loop by designing and/or operating the PSA such that it allows for a breakthrough of constituents such as, for example, nitrogen, carbon monoxide and methane. Because $CO_2$ can be easily captured by adsorption, this type of design and/or operation can allow for the breakthrough of some or most of the other non-$CO_2$ constituents.

According to another embodiment, build up of these constituents can be prevented by not employing a recycle loop. According to this embodiment, the PSA could be designed and operated to avoid breakthrough of any of these constituents, and, the compression and cooling equipment in subsequent processing zones (e.g., liquefaction zone 250) will effectively condense as much of the $CO_2$ as possible. As this design avoids a recycle loop, it will avoid any buildup of the non-hydrogen and non-$CO_2$ constituents. A specific embodiment of a non-recycle loop PSA is provided in FIGS. 4*a* and 4*b*. In this embodiment, at least a portion of the uncondensed $CO_2$ leaving with the nitrogen, carbon monoxide and methane can end up discharging in conduit 210, thereby resulting in a slightly lower $CO_2$ recovery. This amount of $CO_2$ lost from recovery, can be controlled by adjusting the discharge pressure from the compressor shown within equipment 250, shown on FIGS. 4*a* and 4*b*. In addition, other (more drastic) means by which this amount of $CO_2$ can be mostly prevented from entering the high-pressure hydrocarbon product stream, including, for example by utilizing any of the other methods disclosed (e.g., absorption and/or freezing) as additional recovery methods for use in second separation zone 200.

According to one or more embodiments wherein adsorption is utilized as a $CO_2$ recovery method in separation zone 200, the tail gas (off-gas) stream produced from the adsorption system comprises at least a portion or substantially all of the captured $CO_2$ and at least a portion of the hydrogen originating from the uncondensed $CO_2$-lean fraction introduced into second separation zone 200 via conduit 160. In the adsorption step (e.g., the PSA) can be designed to recover between 70 and 93 percent of the total amount of hydrogen originally present in the incoming gas stream. This recovered hydrogen stream can remain at high pressure and can be discharge to conduit 210.

According to another embodiment of the present invention, at least a portion of the $CO_2$ recovered in second separation zone 200 can be absorbed from the incoming uncondensed $CO_2$-lean gas stream using one or more circulating liquid solvents. In one embodiment, the absorption of $CO_2$ produces a $CO_2$-rich off gas stream, represented by stream 220 in FIG. 1, which can subsequently be routed to liquefaction stage 250, wherein the stream can be further compressed and/or cooled to produce the $CO_2$-rich liquid stream in conduit 230. As described previously, the pressure of the $CO_2$-rich liquid stream in conduit 230 can be adjusted, via pump to a pressure similar to that of the $CO_2$-rich fraction in conduit 160 before the combined $CO_2$-rich stream can be introduced into the third separation zone 300 for purification of the $CO_2$.

In one embodiment, the absorption step can utilize one or more circulating solvents to capture the $CO_2$ via physical, or chemical, or combined (physical/chemical) absorption. Regardless of the specific solvent employed, the unabsorbed, non-$CO_2$ gas stream can leave second separation zone 200, via conduit 210 at a pressure similar to the pressure of the feed pressure to zone 200, available at conduit 160. The captured $CO_2$-rich off gas is released from the solvent at one or several pressures ranging from 8 to 400 psia, depending on the solvent used, and the design of the absorption process. Any suitable circulating solvent can be employed during absorption including, for example, one or more solvents selected from the group consisting of methanol, SELEXOL solvent (e.g., dimethyl ethers of polyethylene glycol or DEPG), PURISOL solvent (e.g., N-methylpyrrolidone or NMP), MORPHYSORB solvent (e.g., N-formylmorpholine or NFM and/or N-amylmorpholine or NAM) sulfinol solvent (Solfolane and di-isopropanolamine or Solfolane and methyldiethanolamine), Flexsorb SE solvent (Solfolane and sterically-hindered amine), reversible ionic liquids, propylene carbonate, hot potassium carbonate, amines, chilled ammonia, ammonium carbonate, and combinations thereof.

In one embodiment, the circulating solvent can comprise or be methanol and may, in some embodiments, allow for the $CO_2$ to be regenerated at about 200 psig, or above. In another embodiment, other solvents may be found, or developed in the future which would enable the $CO_2$ to be released at even higher pressures. For example, the regeneration pressure of $CO_2$ absorbed by a chilled ammonia solution can be capable of releasing the $CO_2$ in the range 150 to 400 psia. On example of such a process can be found in U.S. Patent Application Publication No. 2010/0064889. In general, it may be desirable to maximize the regeneration pressure of the off gas stream, thereby minimizing the energy needed to recompress the captured $CO_2$. Depending on the particular solvent chosen, one or more additional steps (e.g., drying to remove residual moisture) may be needed to treat the $CO_2$-rich off gas stream prior to further cooling and/or compression.

According to yet another embodiment of the present invention, at least a portion of the $CO_2$ recovered in second separation zone 200 can be frozen from the incoming uncondensed $CO_2$-lean gas stream to thereby provide $CO_2$ solids, represented in FIG. 1 as stream 221. In order to recover the $CO_2$ in a liquid form, the solids can be melted to form a $CO_2$-rich melted stream in conduit 222, which can ultimately be combined with (optionally after being pumped to a similar pressure) as the condensed $CO_2$-rich fraction in conduit 170 before entering the third zone 300, the purification zone as shown in FIG. 1.

The deliberate freezing of $CO_2$ in the second separation zone 200 can be accomplished in several ways. In one embodiment, at least a portion of the $CO_2$ solids can be formed on the surfaces of one or more heat exchangers (e.g., finned heat exchangers supplied with refrigerant sufficiently cold so as to cause the $CO_2$ in the vapor phase to be frozen on to the extended fins of the heat exchanger.) According to this embodiment, once the fins are substantially covered with frozen $CO_2$, the heat exchanger could be "regenerated" by increasing the temperature of the heat exchanger surface by, for example, causing a condensed stream of relatively warm refrigerant to be cooled against the melting solid $CO_2$. The resulting melted $CO_2$ stream could then be collected and pumped to be combined with $CO_2$-rich stream in conduit 170. At the same time, a second finned heat exchanger, operated in parallel, can be placed in service to deliberately freeze more $CO_2$ thereon. These two exchangers can then be operated in a batch or semi-batch mode, alternating between freezing $CO_2$ and regenerating (or melting) $CO_2$ to form a $CO_2$-rich liquid stream. The heat exchangers can be arranged either in a parallel operation or in a leading-and-lagging arrangement to maximize the fins capacity to remove $CO_2$ prior to regeneration.

In one embodiment wherein at least a portion of the $CO_2$ is recovered via freezing, the equipment can be designed to allow the $CO_2$ to deposit on one or more downward pointing cylindrical posts having a slight taper. This could allow solid $CO_2$ "rings" to form on the post, which could allow the rings to slide off into a lock hopper or other solids transport device. The rings could be caused to slide off the post by increasing the temperature of the deposition surface by, for example, replacing the cold refrigerant inside the heat exchanger surface with warm condensed refrigerant at pressure. The recovered solid $CO_2$ rings could then be dropped from the lock hopper into a $CO_2$ melter, while maintaining the pressure above the $CO_2$ to ensure the $CO_2$ remains in a liquid state above the triple point temperature and pressure. This embodiment is broadly illustrated in FIGS. 6*a* and 6*b*, which will be discussed in detail shortly.

Yet another embodiment of second separation zone 200 that employs a freezing step to recover at least a portion of the $CO_2$ is to utilize a process including a Control Freezing Zone process, such as, for example, the CFZ process that utilizes a distillation column for freezing the $CO_2$ via direct contact heat exchange. On example of a process can be found in U.S. Pat. No. 5,062,270. In a alternative variation, at least a portion of the freezing step can be accomplished using a process similar to the CRYOCELL process in which substantially pure $CO_2$ is extracted as a solid and subsequently melted to recover liquid $CO_2$. In a still other embodiment, a liquid direct contact cooler can be used to freeze the $CO_2$ from the incoming gas stream. According to this embodiment, a suitable liquid, capable of being pumped below the freezing point temperature of $CO_2$, can be sprayed into a counter current contact column with the gas stream to be contacted. By virtue of direct contact with the chilled liquid, the $CO_2$ will cool and freeze and the solid (snow-like) particles of $CO_2$ will descend to the bottom or lower tray of the column. A slurry of $CO_2$ solids and contact liquid can then be pumped from the tower and directed for further processing including, for example, centrifugation and melting, or heating and decanting. Preferably, the direct contact heat transfer fluid would have a significantly different enough density from the melted $CO_2$ such that, when the solid $CO_2$ is melted within the direct contact heat transfer fluid, it can form a separate layer from the direct contact heat transfer fluid, thereby facilitating subsequent physical separation at minimal cost.

Regardless of the $CO_2$ recovery method or methods utilized in the second separation zone 200, the $CO_2$-rich tail gas (in the case of adsorption), the $CO_2$-rich off gas (in the case of absorption) and/or the $CO_2$ solids (in the case of freezing) can be converted to the $CO_2$-rich liquid stream in conduit 230 via cooling and compression (if originally a gas) or melting (if originally a solid). The $CO_2$-rich liquid in conduit 230 can be combined with the condensed $CO_2$-rich fraction in conduit 170 at or near substantially the same pressure before the combined $CO_2$-rich stream in conduit 260 can be introduced into the $CO_2$ purification zone 300. The pressure of the combined $CO_2$-rich liquid stream in conduit 260 can be at a minimum of 77 psia, (a liquid above the triple point), and can be as much as 1070 psia, (the critical pressure of $CO_2$). In a preferred embodiment, the pressure range of the feed stream introduced to separation zone 300 can be between 60% to 95% or 65% to 85% of the critical pressure of $CO_2$ (e.g., about 700 psia to 910 psia).

In one embodiment, the condensed $CO_2$-rich fraction exiting the first separation zone 150 via conduit 170 and/or the $CO_2$-rich liquid stream exiting second separation zone 200 via conduit 230 can be pumped to a pressure within the preferred pressure range of 700 to 910 psia, or at least 100, 750, or 1070 psia. Third separation zone 300 can comprise one or more separation devices for removing at least a portion, or substantially all, of the non-$CO_2$ components to thereby provide a purified $CO_2$-rich liquid stream that can comprise $CO_2$ between 85 and 99.99%, while still maintaining the high pressure of the purified $CO_2$ liquid stream. The $CO_2$-rich liquid stream in conduit 260 can comprise of at least 80, 90, or 95 mole percent $CO_2$, which can be equal to about 70, 90, 98, 99, or 100 percent of the $CO_2$ originally present in the high-pressure feed gas stream. The temperature of the $CO_2$-rich liquid stream can be no warmer than its bubble point temperature in order to pump it to its optimum pressure for purification in the third separation zone 300.

Third separation zone 300 can employ any suitable technique for separating non-$CO_2$ components such as: methane, CO, nitrogen and hydrogen from the combined $CO_2$-rich liquid stream in conduit 260 including, for example, distillation, fractionation, flashing, and the like. In one embodiment, third separation zone 300 comprises one or more distillation column for fractionating the combined $CO_2$ stream in conduit 260. The combined $CO_2$ stream in conduit 260 can be introduced into the upper portion of a first distillation column within zone 300, which can include a plurality of vapor-liquid contacting surfaces such as trays or packing. The specific placement of the feed location depends, in part, on the concentration of lighter-end impurities that need to be removed from the combined $CO_2$ stream. The feed location can be positioned a few stages below the condenser inlet in the upper portion of the column.

The overhead vapor product withdrawn from the distillation column (not shown) in third separation zone 300 can comprise substantially all of the non-$CO_2$ components having a lower boiling point than carbon dioxide. The volumetric flow rate of the overhead stream is relatively smaller than the flow rate of the bottoms stream withdrawn from the column, which comprises substantially all of the purified $CO_2$. In one embodiment, the overhead stream in conduit 310 can be combined with the hydrogen-rich stream in conduit 210 withdrawn from second separation zone 200. Alternatively, the overhead stream could be recycled back (via conduit 330) and combined with the high-pressure feed gas stream prior to first separation zone in conduits 100A and/or 100B and/or combined with the uncondensed $CO_2$-lean vapor fraction upstream of second separation zone 200 in conduit 160.

The bottoms stream withdrawn from the distillation column (not shown) comprises substantially pure $CO_2$. The pressure of this stream in conduit 320 can be increased via one or more booster pumps to thereby provide a purified $CO_2$-rich stream at or above the critical pressure of $CO_2$. Thereafter, the high-pressure, purified $CO_2$ stream can be injected into a geological formation (at or greater than the average formation pressure) or can be further utilized in other processes (e.g., Enhanced Oil Recovery).

As discussed previously, embodiments of the present invention have wide applicability to a variety of $CO_2$ recovery facilities. Typically, the $CO_2$ recovery facility can be arranged such that the equipment utilized in first, second, and third separation zones 100, 200, 300 and, if present, first and second enrichments zones 130, 190, as well as any pre- or post-treatment equipment is located on an area plot space suitably sized to accommodate all the necessary equipment. The processing facilities can be designed to process a wide variety of feed streams, including, for example, high-pressure synthesis gas created from the partial oxidation of coal, coke, and/or biomass followed by one or more CO-shift reactors. In another example, the high-pressure feed gas can originate from a steam methane reforming process such as the Advanced Gas Heated Reformer (AGHR) offered by the Johnson Matthey (KATALCO) Cleveland, UK followed by a high temperature CO Shift reactor. In yet another example, the high-pressure feed gas stream can originate from other applications, such as natural gas with very high levels of $CO_2$, such as untreated natural gas found at La Barge, Wyo. or the Natuna basin.

As an example of the present invention, bulk removal of $CO_2$ from a synthesis gas stream in which all sulfur components and water vapor have been removed is described. In one embodiment, a synthesis gas stream produced by gasification of coal, coke or biomass, can undergo a CO shift reaction in one or more CO Shift reactors, as shown in FIG. 2. The resulting cooled and dried synthesis gas can comprise about 50 mole percent $CO_2$ and the pressure can be in the range of between 400 and 1,200 psig. The upper pressure limit can be based, in large part, on current state-of-the-art equipment design pressure and economic considerations rather than recovery or process limits. Thus, it should be understood that ultra-high-pressure gasifiers, contemplated in possible future operations, will also be a suitable application for systems and processes configured according to embodiments of the present invention.

In another example, process configured according to various embodiments of the present invention can be used for recovery of $CO_2$ from the steam methane reforming application. In this embodiment, the synthesis gas exiting the high temperature shift can be cooled and dehydrated prior to processing as described above. In this specific embodiment, the feed gas composition can comprise roughly 15 volume percent $CO_2$, with the balance being non-$CO_2$ stream components. The feed gas pressure according to this embodiment can be in the range of 250 to 375 psia. In some embodiments, feed gas streams with low pressure and/or low $CO_2$ concentration may only provide marginal economic benefit. In the preceding example of processing the synthesis gas from a steam methane reformer followed by co-shift reaction, it may be economically advantageous to process the cooled and dry synthesis gas through the optional device 130, such as a membrane separator. This will allow for the removal of a large volume of mostly hydrogen through the permeate stream, which can be sent via conduit 102 (as shown generally in FIG. 1). The balance of synthesis gas, the non-permeate can be more concentrated in $CO_2$. This can benefit the effectiveness of the present invention. The non-permeate can enter 150, via conduit 100B at a higher concentration of $CO_2$ than the gas stream from conduit 100A. According to one embodiment, it can be advantageous to separate at least a portion of the $CO_2$ from the high-pressure feed gas in a liquid form. It can also be advantageous to maximize the pressure of the $CO_2$ recovered, as a vapor or a solid, in the second separation zone 200. It may prove to be advantageous to maximize the $CO_2$ content of the high-pressure gas stream in conduits 100A via zone 130.

Turning now to FIGS. 4-6, several $CO_2$ recovery facilities, configured according to three embodiments of the present invention, are illustrated, particularly showing specific methods for recovering $CO_2$ from the cooled $CO_2$-lean gas stream introduced into second separation zone 200 shown in FIG. 1.

Figure 4A:
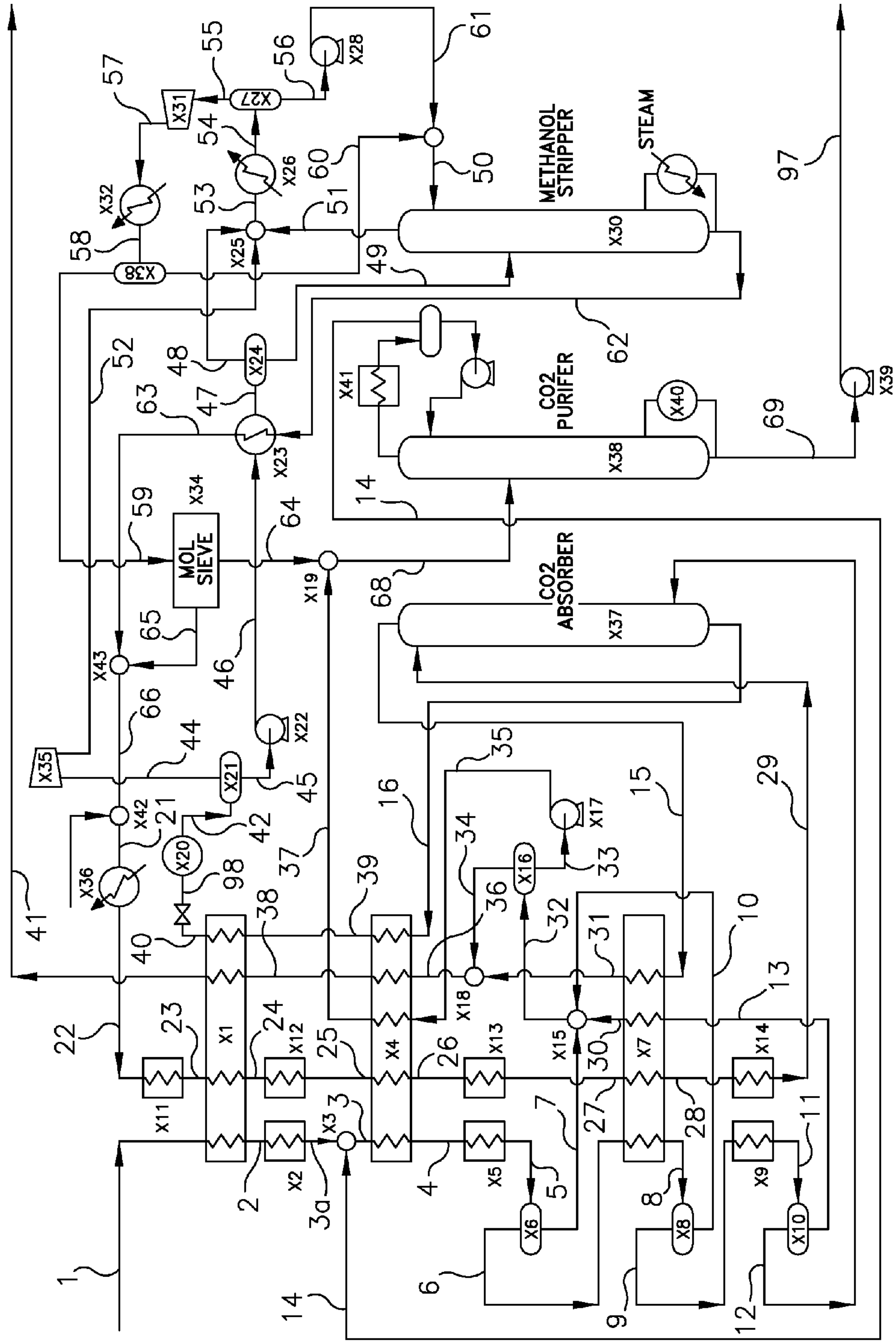
FIGS. 4*a* and 4*b* are schematic flow diagrams representing one embodiment of a $CO_2$ recovery facility configured according to the present invention, wherein the facility utilizes an absorption method to remove at least a portion of the $CO_2$ from an incoming feed gas stream.
Figure 4B:
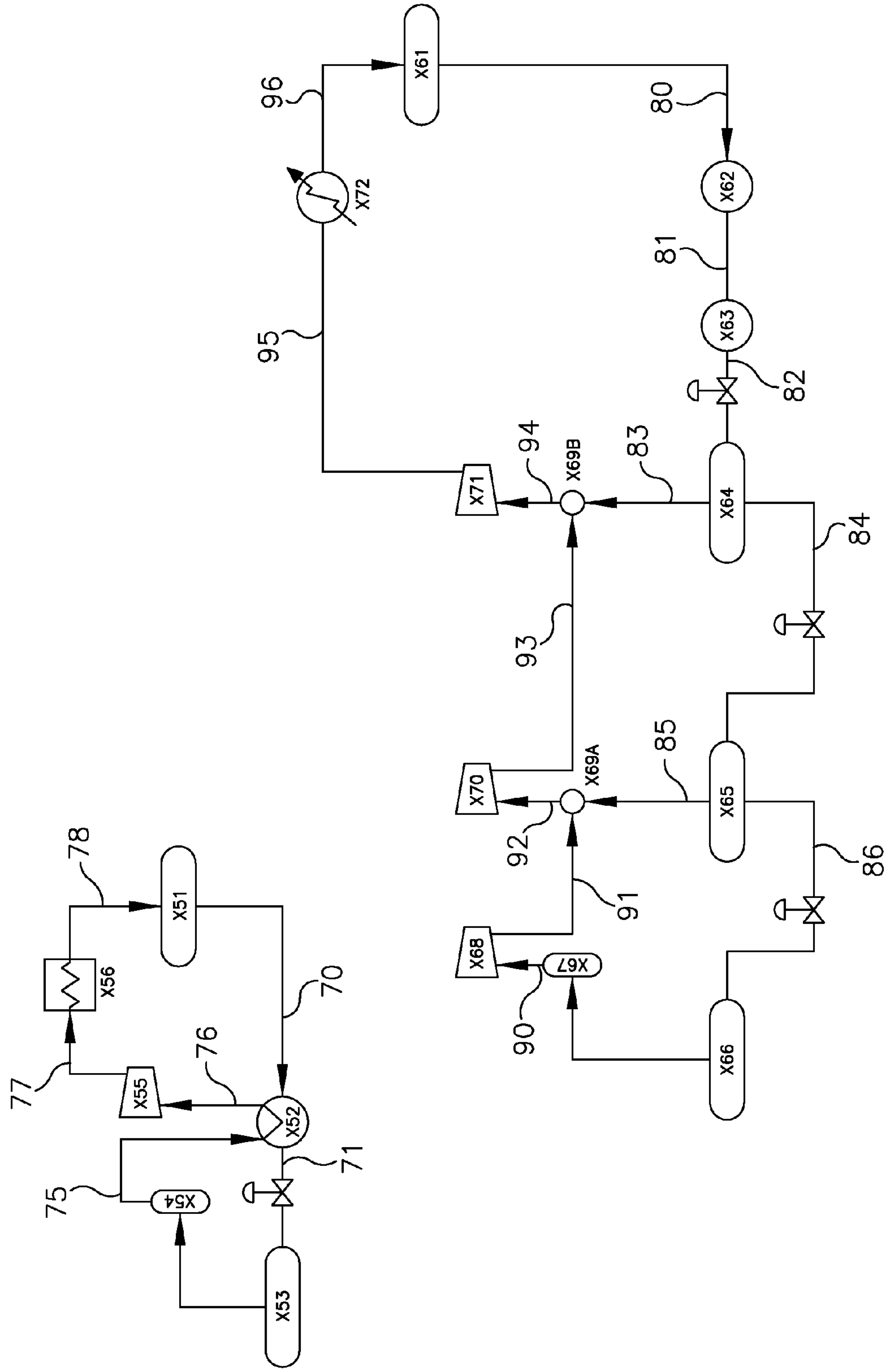
Figure 5A:
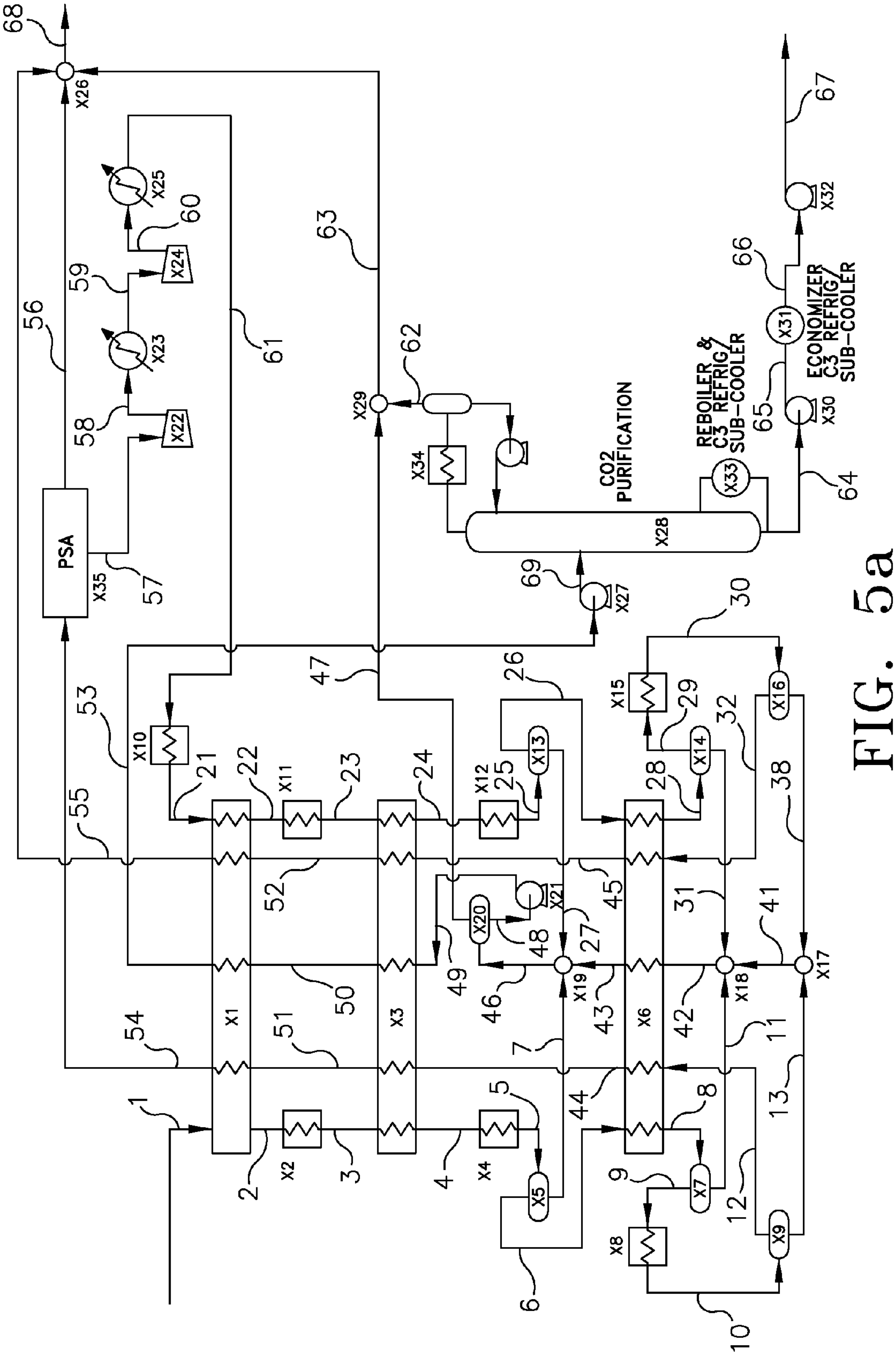
FIGS. 5*a* and 5*b* are schematic flow diagrams representing another embodiment of a $CO_2$ recovery facility configured according to the present invention, wherein the facility utilizes an adsorption method to remove at least a portion of the $CO_2$ from an incoming feed gas stream.
Figure 5B:
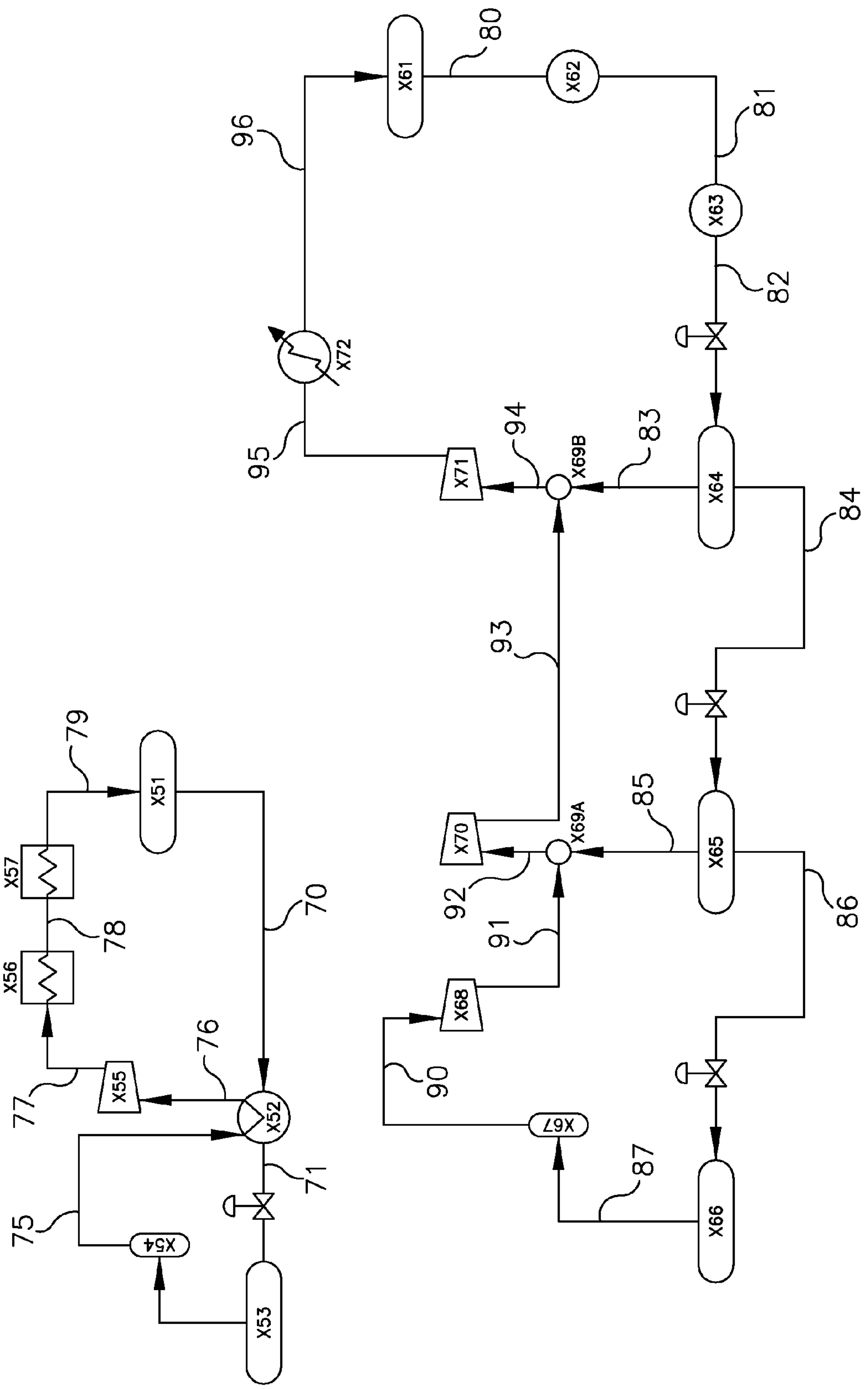
Figure 6A:
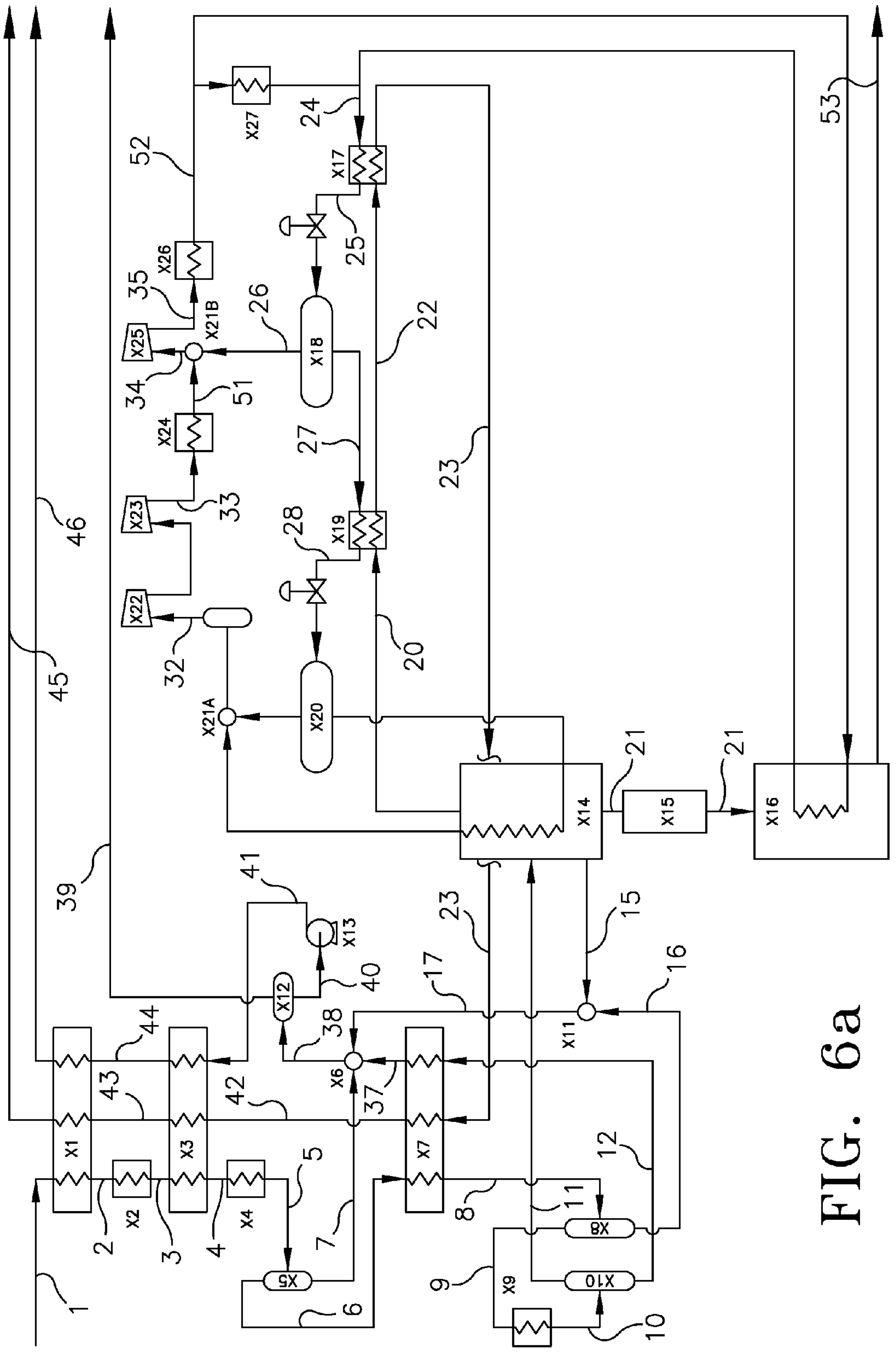
FIGS. 6*a* and 6*b* are schematic flow diagrams representing yet another embodiment of a $CO_2$ recovery facility configured according to the present invention, wherein the facility utilizes a deliberate freezing method to remove at least a portion of the $CO_2$ from an incoming feed gas stream.
Figure 6B:
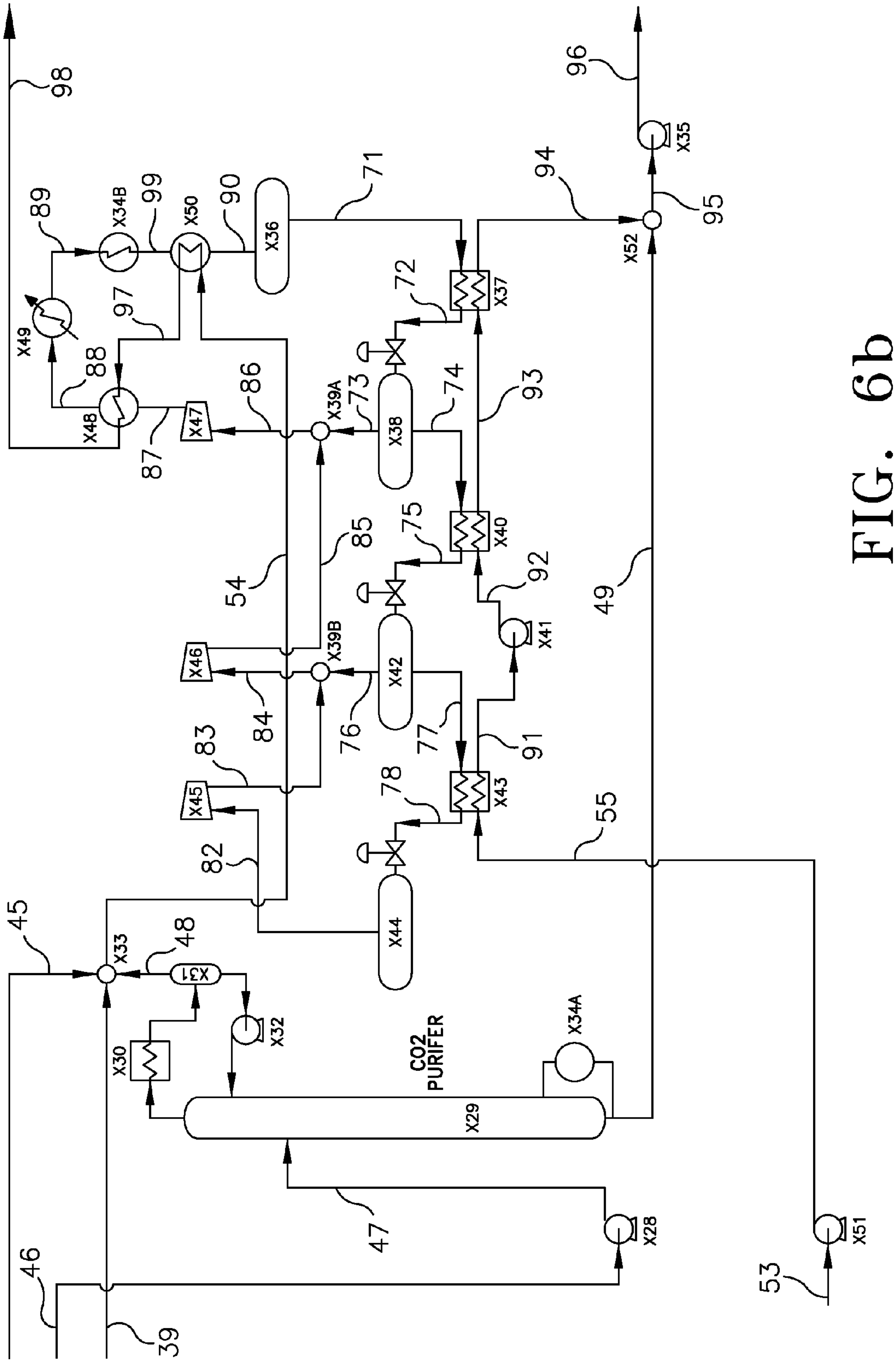

FIGS. 4*a* and 4*b* provide a schematic representation of a $CO_2$ recovery facility wherein at least a portion of the $CO_2$ captured is recovered via an absorption stage. FIGS. 5*a* and 5*b* illustrate a $CO_2$ recovery facility employing an adsorption stage in the second separation zone, and FIGS. 6*a* and 6*b* depict a $CO_2$ recovery facility utilizing deliberate freezing to recover $CO_2$ from the cooled feed gas stream exiting the first separation zone. The specific configuration and operation of each of these embodiments of the present invention will now be described in detail, beginning with FIGS. 4*a* and 4*b*.

Turning first to FIGS. 4*a* and 4*b*, this embodiment of a $CO_2$ recovery facility, which employs an absorption stage for recovering $CO_2$, is provided. Table 2, below, is a summary of the equipment utilized in the embodiment shown in FIGS. 4*a* and 4*b*.

TABLE 2

Summary of Equipment for $CO_2$ Recovery Facility in FIGS. 4a and 4b

| Equipment No. | Equipment Type | Cross Reference |
|---|---|---|
| X 1 | BAHX | |
| X 2 | Core in Kettle | X 65 |
| X 3 | Mixer | |
| X 4 | BAHX | |
| X 5 | Core in Kettle | X66 |
| X 6 | V/L Separator | |
| X 7 | BAHX | |
| X 8 | V/L Separator | |
| X 9 | Core in Kettle | X 53 |
| X 10 | V/L Separator | |
| X 11 | Core in Kettle | X 64 |
| X 12 | Core in Kettle | X 65 |
| X 13 | Core in Kettle | X 66 |
| X 14 | Core in Kettle | X 53 |
| X 15 | Mixer | |
| X 16 | V/L Separator | |
| X 17 | Pump | |
| X 18 | Mixer | |
| X 19 | Mixer | |
| X 20 | Shell & Tube HX | |
| X 21 | V/L Separator | |
| X 22 | Pump | |
| X 23 | Shell & Tube HX | |
| X 24 | V/L Separator | |
| X 25 | Mixer | |
| X 26 | Shell & Tube HX | |
| X 27 | V/L Separator | |
| X 28 | Pump | |
| X 29 | Mixer | |
| X 30 | Methanol Stripper | |
| X 31 | Compressor | |
| X 32 | Shell & Tube HX | |
| X 33 | V/L Separator | |
| X 34 | Molecular Sieve Package | |
| X 35 | Compressor | |
| X 36 | Shell & Tube HX | |
| X 37 | $CO_2$ Absorber | |
| X 38 | $CO_2$ Purifier | |
| X 39 | Pump | |
| X 40 | Shell & Tube HX | |
| X 41 | Core in Kettle | X 65 |
| X 42 | Mixer | |
| X 43 | Mixer | |
| X 51 | V/L Separator | |
| X 52 | Shell & Tube HX | |
| X 53 | Kettle | X 9 & X14 |
| X 54 | V/L Separator | |
| X 55 | Compressor | |
| X 56 | Core in Kettle | X 66 |
| X 61 | V/L Separator | |
| X 62 | Shell & Tube HX | |
| X 63 | Shell & Tube HX | |
| X 64 | Kettle[1] | X 11 |
| X 65 | Kettle[2] | X2, X12, & X41 |

TABLE 2-continued

| Summary of Equipment for $CO_2$ Recovery Facility in FIGS. 4a and 4b | | |
|---|---|---|
| Equipment No. | Equipment Type | Cross Reference |
| X 66 | Kettle | X5, X13, & X56 |
| X 67 | V/L Separator | |
| X 68 | Compressor | |
| X 69 A | Mixer | |
| X 69 B | Mixer | |
| X 70 | Compressor | |
| X 71 | Compressor | |
| X 72 | Shell & Tube HX | |

[1]May also include two additional exchangers upstream of facility in FIGS. 4a & 4b (not shown). Included in FIG. 2.

[2]May also include one additional exchanger upstream of facility in FIGS. 4a & 4b (not shown). Included in FIG. 2.

In this embodiment, heat exchangers X1, X4 and X7 are brazed aluminum plate fin heat exchangers (BAHX). Typically, BAHX can be employed in cryogenic processing such as cold-end ethylene recovery and purification projects or LNG projects. Sometimes these exchangers can be fabricated from stainless steel. The exchangers designated as X2, X5, X9, X11, X12, X13, X14 (in FIG. 4*a*) and X56 (in FIG. 4*b*), as well as overhead condenser X41 (in FIG. 4*a*) are all be core exchangers immersed within a "kettle" containing refrigerant. These exchangers can be referred to as "core-in-kettle" heat exchangers, such as, for example, those commercially available from Chart Industries of Garfield Heights, Ohio, USA. These exchangers can be capable of economically exchanging heat in cold conditions with close temperatures of approach. In the embodiment described herein, the temperature pinch points of the exchangers can be adjusted to about 4° F. Each flow passageway can have a nominal 8 psi pressure drop, except for the kettles X53, X64, X65, and X66, which can have a pressure drop of about 1 psi in the vaporization of refrigerant to the suction of the refrigeration compressors.

The $CO_2$ facility can comprise a plurality of vapor-liquid separators, illustrated in FIGS. 4*a* and 4*b* as separators X6, X8, X10, X16, X21, X24, X27, X33, X51, X54, X61, and X67 and one or more pumps, shown as pumps X17, X22, X28 and X39. In the embodiment shown in FIGS. 4*a* and 4*b*, equipment X37, X38 and X30 can comprise trayed (or packed) columns containing nominally about 15, 19, and 15 theoretical stages respectively. Equipment X31 and X35 are the first stage and the second stage of gas recompression equipment, which can be used to boost the $CO_2$ gas pressure in the second separation zone. Equipment X34 represents a molecular sieve package, which can be designed to recover the last amount of methanol contained within the $CO_2$ stream, thereby minimizing methanol lost in the $CO_2$ product being sequestered. In a variation of this embodiment, methanol carryover could alternatively be minimized by cooling the pressurized stream to separate out and recover the methanol. Other methods for recovering methanol carried over in the $CO_2$ product are also contemplated and specific selection can depend, in part, on local plant-specific factors and conditions.

Turning now to FIG. 4*b*, in this embodiment, the refrigeration equipment utilized in the first separation zone to cool the incoming feed gas is provided. The refrigeration system illustrated in FIG. 4*b* comprises a cascade refrigeration cycle that utilizes propane and ethane as the two cascading refrigerants. In another variation of this embodiment, it is possible instead to have a single refrigerant system by using a mixed refrigerant, typically a mixed refrigerant could be custom blended from propane and ethane (or other compounds suitable for refrigeration at these temperatures). Another refrigerant cooling system suitable for use in embodiments of the present invention is described in US Patent Application Publication No. 2009/0301108, the disclosure of which is incorporated herein by reference to the extent not inconsistent with the present disclosure.

Turning back to the refrigeration system shown in FIG. 4*b*, the warmest refrigeration level is the first propane kettle, X64. The core exchangers within kettle X64 can be operable to cool down the process fluid to 45° F. The vaporizing refrigerant can be at a temperature of about 41° F., thereby allowing for a 4° F. approach temperature. Kettle X64 can include any number of core exchangers, and, in this embodiment, can include one for each cooling service. According to the embodiment (not shown in FIGS. 4*a* and 4*b*), one or more of the cooling streams illustrated in FIGS. 4*a* and 4*b* can be used to cool the feed stream upstream of the facility (and, optionally, upstream of a mole sieve dryer, not shown). In addition, one or more core exchangers can be included in kettle X64 for use in cooling streams upstream in a selective sulfur removal process (e.g. a SELEXOL process) positioned upstream of the CO shift reactions (not shown in FIGS. 4*a* and 4*b*). These specific heat core-in-kettle heat exchangers are generally illustrated in FIG. 2.

The next colder refrigeration level of the system shown in FIG. 4*b* is the second propane kettle, X65, which can include the core exchangers for cooling the process fluids to −2° F. In this embodiment, the vaporizing refrigerant can have a temperature of about −6° F. to allow for a 4° F. approach temperature. Kettle X65 can include core exchangers for the following services: (1) one for the SELEXOL process upstream from the present invention (not shown on FIG. 4*a* or 4*b*), but can be found in FIG. 2; (2) core exchangers X2, X12, and (3) overhead condenser core exchanger X41, as illustrated in FIGS. 4*a* and 4*b*.

The next colder refrigeration level of the refrigeration system in FIG. 4*b* can be the third propane kettle, X66, which includes the core exchangers for cooling the process fluids passing therethrough to a temperature of about −38° F. According to this embodiment, the vaporizing refrigerant can have a temperature of about −42° F. to allow for a 4° F. approach temperature. Kettle X66 can include the following core heat exchangers: (1) core exchanger X5; (2) core exchanger X13; and (3) core exchanger X56. Exchanger X56 is the condenser within the ethane condenser circuit and this type of inter-loop heat exchange is characteristic of a cascade refrigeration system. Mixed refrigerant systems would not include a condenser in this service.

In both the cascade refrigeration system and the mixed refrigerant system, the lowest temperature of the refrigerant can be limited by the vapor pressure of the saturated refrigerant liquid at 14.7 psia. In the case of propane, this lower limit temperature can be about −42° F. If the temperature of the refrigerant dropped below this limit, the vapor pressure will dip below atmospheric pressure, causing the first stage refrigeration compressor to operate at sub-atmospheric pressure. While it is technically possible to do so, it may be more desirable to operate the system such that the suction pressure of the refrigeration compressor is greater than atmospheric pressure to thereby avoid inducing air through compressor seals and leaking the air into the refrigerant system. Such leaks may not only compromise the cooling effectiveness of the refrigerant and increase the power consumed by the compressor, but could also pose a safety hazard due to mixing air with a hydrocarbon under compression, a possible ignition source.

In some embodiments, propylene could also be selected as a refrigerant in the first cycle, especially when lower temperatures are desired because, for example, propylene can have the ability to operate colder than −42° F., while still maintaining a vapor pressure greater than atmospheric pressure. In other embodiments, different refrigeration cycles or loops may be added to reduce the temperature of the feed gas. Typically, the selection of the specific refrigerant for the first cycle can depend on a variety of site-specific and plant-specific conditions and parameters.

In the refrigeration system shown in FIG. 4*b*, the next colder refrigeration level is the first (and only) ethane kettle X53, which includes two core exchangers for cooling the process fluid to a temperature of about −64° F. The vaporizing refrigerant can be at a temperature of about −68° F. to allow for a 4° F. approach temperature. Kettle X53 can include the two core heat exchangers X9 and X14. In general, it is desirable to minimize cold spots in these final core exchangers, which can be accomplished by, for example, maintaining the refrigerant temperature to be slightly warmer than the freezing temperature of $CO_2$ of −69.8° F. (e.g., at a temperature of about −68° F.). The ethane refrigeration circuit in FIG. 4*b* depicts an economizer exchanger, X52, which can be optional, depending on various site-specific parameters.

As shown in FIG. 4*b*, the propane compressor includes respective low, medium, and high stage compression stages X68, X70 and X71. Propane condenser X72 can exchange the superheat and the latent heat of condensation of the refrigerant against cooling water. In another embodiment, the superheat and some latent heat of the propane refrigerant could be exchanged against the high-pressure pure hydrogen stream in conduit 41 (FIG. 4*a*), which can, in some embodiments, ultimately be used to fuel a Brayton Cycle gas turbine (not depicted in FIG. 4*a* or 4*b*). According to this embodiment, even a slight temperature rise in the fuel feed stream can improve the heat rate of the combined cycle turbine, while at the same time saving some of the utility costs by reducing the amount of cooling water needed and/or the power consumed by the propane refrigeration compressor.

It should be understood that the specific temperatures selected to operate the various refrigerant kettles are disclosed by way of example. Other combination of selected temperatures could be equally valid, or prove to be a more optimal selection of temperatures. This is usually determined by specific refrigeration compressor design, after a vendor has been selected. The final temperature at the −68° F. can be important to maintain, however; due to reasons already disclosed.

Turning now to the horizontal orientated phase separator X16 in FIG. 4*a*, the pressure of separator X16 can be set such that the pressure of stream 32 is reduced slightly upon entry into the vessel. This slight vapor flash can release mostly light-end constituents and a small amount of $CO_2$. The release of some light-ends at this location can be beneficial as it may allow for a $CO_2$ stream with a bubble point temperature warmer for a given pressure compared to the $CO_2$ stream without a flash step.

As shown in FIG. 4*a*, the liquid $CO_2$ stream exiting phase separator X16 can be pumped via pump X17 to a suitable pressure. The discharge pressure of pump X17 can be selected to maximize heat recovery in exchanger X4. If the selected pressure is too high, the heat of pumping may increase the temperature of the $CO_2$ stream, thereby limiting cold recovery in X4. If the selected discharge pressure of X17 is too low, the temperature of the stream in conduit 37 may be too cold, thereby limiting the cold recovery in X4. The specific discharge pressure selected for pump X17 is a function of the composition of the liquid $CO_2$ leaving separator X16, which can also be a function of the feed composition and the performance of various other pieces of equipment within the process.

Turning now to FIGS. 5*a* and 5*b*, another embodiment of a $CO_2$ recovery facility utilizing adsorption to recover at least a portion of the incoming $CO_2$ is provided. Table 3, below, is a summary of the equipment utilized in the embodiment shown in FIGS. 5*a* and 5*b*.

TABLE 3

Summary of Equipment for $CO_2$ Recovery Facility in FIGS. 5a and 5b

| Equipment No. | Equipment Type | Cross Reference |
|---|---|---|
| X 1 | BAHX | |
| X 2 | Core in Kettle | X 65 |
| X 3 | BAHX | |
| X 4 | Core in Kettle | X66 |
| X 5 | V/L Separator | |
| X 6 | BAHX | |
| X 7 | V/L Separator | |
| X 8 | Core in Kettle | X53 |
| X 9 | V/L Separator | |
| X 10 | Core in Kettle | X64 |
| X 11 | Core in Kettle | X65 |
| X 12 | Core in Kettle | X66 |
| X 13 | V/L Separator | |
| X 14 | V/L Separator | |
| X 15 | Core in Kettle | X53 |
| X 16 | V/L Separator | |
| X 17 | Mixer | |
| X 18 | Mixer | |
| X 19 | Mixer | |
| X 20 | V/L Separator | |
| X 21 | Pump | |
| X 22 | Compressor | |
| X 23 | Shell & Tube HE | |
| X 24 | Compressor | |
| X 25 | Shell & Tube HE | |
| X 26 | Mixer | |
| X 27 | Pump | |
| X 28 | $CO_2$ Purification Column | |
| X 29 | Mixer | |
| X 30 | Pump | |
| X 31 | Shell & Tube HE | |
| X 32 | Pump | |
| X 33 | Shell & Tube HE | |
| X 34 | Core in Kettle | X65 |
| X 35 | PSA | |
| X 51 | V/L Separator | |
| X 52 | Shell & Tube HE | |
| X 53 | Kettle | X8, X15 |
| X 54 | V/L Separator | |
| X 55 | Compressor | |
| X 56 | Core in Kettle | X65 |
| X 57 | Core in Kettle | X66 |
| X 61 | V/L Separator | |
| X 62 | Shell & Tube HE | |
| X 63 | Shell & Tube HE | |
| X 64 | Kettle[1] | |
| X 65 | Kettle[2] | |
| X 66 | Kettle | |
| X 67 | V/L Separator | X10 |
| X 68 | Compressor | X2, X11, X 34, X56 |
| X 69A | Mixer | X4, X12, X57 |
| X 69B | Mixer | |
| X 70 | Compressor | |
| X 71 | Compressor | |
| X 72 | Shell & Tube HE | |

[1]May also include two additional exchangers upstream of facility in FIGS. 5a & 5b (not shown). Included in FIG. 2.

[2]May also include one additional exchanger upstream of facility in FIGS. 5a & 5b (not shown). Included in FIG. 2.

In this embodiment, equipment X1, X3 and X6 are brazed aluminum plate fin heat exchangers (BAHX). Sometimes these exchangers can be fabricated from stainless steel or any other suitable material. Exchangers designated as X2, X4, X8, X10, X11, X12, X15, X56 and X57 and the overhead condenser X34 in FIGS. 5*a* and 5*b* can all comprise core exchangers immersed within a "kettle" containing a refrigerant, similar to those previously discussed with respect to FIGS. 4*a* and 4*b*. Similarly to the facility shown in FIGS. 4*a* and 4*b*, temperature approaches for each exchanger can be about 4° F. and each flow passageway can have a nominal pressure drop of about 8 psi, except for kettle X53, X64, X65, and X66, which can have a pressure drop of about 1 psi in the vaporization of refrigerant to the suction of the refrigeration compressors.

Equipment X5, X7, X9, X13, X14, X16, X20, X51, X54, X61 and X67 can be vapor-liquid phase separators and equipment X21, X27, X30 and X32 are pumps. Equipment X28 is a trayed (or packed) column comprising a nominal 19 theoretical stages. Equipment X22 and X24 are the first stage and the second stage of gas recompression equipment, which can be used to boost the $CO_2$ gas pressure in the second separation zone.

Equipment X35 can comprise a PSA package for recovering about 90 percent of the hydrogen from the stream feeding the PSA equipment. In some embodiments, it may be possible to allow for breakthrough of some of non-$CO_2$ components, such as carbon monoxide (CO), methane ($CH_4$) and nitrogen ($N_2$) to occur. The optimum trade off of hydrogen recovery (e.g., in the range of 70 to 93 percent) versus equipment cost and operating expenses can be carried out on a system-specific or facility-specific basis. It should be noted that one or more system-specific or facility-specific factors can influence the desired recovery of hydrogen to be outside the typical range provided above.

Turning now to FIG. 5*b*, the refrigeration equipment for affecting the cooling of the feed gas stream is shown. The refrigeration system illustrated in FIG. 5*b* can be configured and operated in a similar manner to the refrigeration system illustrated in FIG. 4*b* and previously described. For the sake of brevity, only the differences between the cascade refrigeration systems shown in FIG. 4*b* and FIG. 5*b* can be described herein, with the understanding that all or part of the previous description of the facility in FIG. 4*b* may be applicable to FIG. 5*b*.

In the embodiment shown in FIG. 5*b*, first propane kettle X64 can include the following core heat exchangers: (1) one for cooling the process fluid upstream of a mole sieve dryer (not shown in FIG. 5*a* or 5*b*, See FIG. 2); (2) one for use in a sulfur removal process, such as SELEXOL, utilized upstream of the facility shown in FIGS. 5*a* and 5*b*; and (3) core exchanger X10. This embodiment, second propane kettle X65 can include the following core heat exchangers: (1) a core for use in the sulfur removal (e.g., SELEXOL) process upstream from the present invention (not shown in FIG. 5*a* or 5*b*, see FIG. 2); (2) core exchanger X2; (3) core exchanger X11; (4) core exchanger X56; and (5) overhead condenser core exchanger X34, as illustrated in FIG. 5*a*. Third propane kettle X66 of the refrigeration system depicted in FIG. 5*b* can include the following core heat exchangers: (1) core exchanger X4; (2) core exchanger X12; and (3) ethane condenser X57. Ethane kettle X53 can include core exchangers X8 and X15. Although illustrated in FIG. 5*b* as exchanging heat with cooling water, propane condenser X72 could alternatively exchange superheat and/or latent heat with the high-pressure hydrogen stream in conduit 68, which can ultimately be utilized by a Brayton cycle gas turbine, as discussed previously.

Turning back to FIG. 5*a*, the horizontally-oriented phase separator X20 can have a pressure level such that the stream in conduit 46 is flashed upon introduction therein, thereby releasing at least a portion of the light-end constituents and a small amount of $CO_2$ from the stream. As shown in FIG. 5*a*, the liquid $CO_2$ stream withdrawn from separator X20 can be routed to pump X21 and pumped to any suitable pressure. The discharge pressure of pump X21 can be optimized to maximize heat recovery in X1 and X3 in an analogous manner as described in detail previously with respect to FIGS. 4*a* and 4*b*. In this embodiment, additional heat and/or energy saving configurations, specifically shown in FIGS. 5*a* and 5*b* can also be employed. For example, streams having a colder-than-ambient temperature can be exchanged from X31 and/or X33 and can be used to pre-cool the liquid propane refrigerant prior to its introduction into kettle X64, further enhancing the efficiency of the propane refrigeration loop or cycle.

Turning finally to FIGS. 6*a* and 6*b*, yet another embodiment of a $CO_2$ recovery facility configured according to the present invention is provided. The facility depicted in FIGS. 6*a* and 6*b* utilizes deliberate freezing to recover at least a portion of the $CO_2$ from its incoming feed stream. Table 4, below, is a summary of the equipment depicted in the embodiment shown in FIGS. 6*a* and 6*b*.

TABLE 4

Summary of Equipment for $CO_2$ Recovery Facility in FIGS. 6a and 6b

| Equipment No. | Equipment Type | Cross Reference |
|---|---|---|
| X 1 | BAHX | |
| X 2 | Core in Kettle | X42 |
| X 3 | BAHX | |
| X 4 | Core in Kettle | X44 |
| X 5 | V/L Separator | |
| X 6 | Mixer | |
| X 7 | BAHX | |
| X 8 | V/L Separator | |
| X 9 | Core in Kettle | X18 |
| X 10 | V/L Separator | |
| X 11 | Mixer | |
| X 12 | V/L Separator | |
| X 13 | Pump | |
| X 14 | Batch Freeze Exchangers ($CO_2$ Solidifier) | |
| X 15 | Lock Hopper | |
| X 16 | $CO_2$ Melter | |
| X 17 | BAHX | |
| X 18 | Kettle | X9 |
| X 19 | BAHX | |
| X 20 | V/L Separator | X14 |
| X 21A | Mixer | |
| X 21B | Mixer | |
| X 22 | Compressor | |
| X 23 | Compressor | |
| X 24 | Core in Kettle | X44 |
| X 25 | Compressor | |
| X 26 | Core in Kettle | X42 |
| X 27 | Core in Kettle | X44 |
| X 28 | Pump | |
| X 29 | $CO_2$ Purification Column | |
| X 30 | Core in Kettle | |
| X 31 | V/L Separator | |
| X 32 | Pump | |
| X 33 | Mixer | |
| X 34A | Shell & Tube HX | |
| X 34B | Shell & Tube HX | |
| X 35 | Pump | |
| X 36 | V/L Separator | |
| X 37 | BAHX | |
| X 38 | Kettle[1] | |
| X 39A | Mixer | |
| X 39B | Mixer | |
| X 40 | BAHX | |
| X 41 | Pump | |
| X 42 | Kettle[2] | X2, X26, X30 |

TABLE 4-continued

| Summary of Equipment for $CO_2$ Recovery Facility in FIGS. 6a and 6b | | |
|---|---|---|
| Equipment No. | Equipment Type | Cross Reference |
| X 43 | BAHX | |
| X 44 | Kettle | X4, X24, X27 |
| X 45 | Compressor | |
| X 46 | Compressor | |
| X 47 | Compressor | |
| X 48 | Shell & Tube HX | |
| X 49 | Shell & Tube HX | |
| X 50 | Shell & Tube HX | |
| X 51 | Pump | |
| X 52 | Mixer | |

[1]May also include two additional exchangers upstream or facility in FIGS. 6a & 6b (not shown).
[2]May also include one additional exchanger upstream of facility in FIGS. 6a & 6b (not shown).

Turning first to FIG. 6*a*, in this embodiment, exchangers X1, X3, and X7 can comprise brazed aluminum plate fin heat exchangers (BAHX), in this embodiment, the exchangers X17, X19, X37, X40, and X43 can also comprise a BAHX, even though each includes only two service sides (e.g., a hot and a cold service). This is not a requirement, but is a suggestion to take advantage of heat exchangers capability of providing a close temperature of approach economically. In another embodiment of the present invention, the BAHX employed in the facility of FIGS. 6*a* and 6*b* could comprise micro-channel equipment, such as those commercially available from Velocys Inc., of Plain City, Ohio, USA. This variation is also applicable to FIG. 4 and FIG. 5. According to this embodiment, each of exchangers X2, X4, X24, X26 and X27 and overhead condenser X30 can comprise core exchangers immersed within a "kettle" comprising a refrigerant. Accordingly, these pieces of equipment can be referred to as "core-In-kettle" heat exchangers. As discussed previously with respect to FIGS. 4*a* and 4*b*, the temperature pinch points for the exchangers can be about 4° F., while the nominal pressure drop of each flow passageway can be about 8 psi, with the exception of kettles X18, X38, X42, and X44, which can have a nominal pressure drop of about 1 psi.

The facility of FIGS. 6*a* and 6*b* comprise a plurality of vapor-liquid separation vessels X5, X8, X10, X12, X20, X31 and X36 and pumps X13, X28, X32, X35, X41 and X51. Column X29 is a trayed (or packed) column containing a nominal 19 theoretical stages.

As shown in FIG. 6*a*, a set of batch freeze exchangers ($CO_2$ solidifier) X14 for at least partially freezing the incoming $CO_2$, can be included within the second separation zone of the $CO_2$ recovery facility. In one embodiment, solidifier X14 can be operable to deliberately freeze the residual $CO_2$ in the gas stream exiting the first separation zone (e.g., the refrigeration system depicted in FIG. 6*b*). According to this embodiment, solidifier X14 can comprise a custom-designed series of batch freeze heat exchangers. In this embodiment, the gas stream withdrawn from the first separation zone via conduit 11 can contact each batch freeze heat exchanger counter-currently, thereby exposing the most-recently regenerated (e.g., the coldest) heat exchanger or heat exchange surface to the final contact with the gas exiting the first separation zone (in conduit 20) to thereby solidify the final amount of residual $CO_2$ to be removed from the gas stream.

In this embodiment, solidifier X14 can comprise a plurality of specialty designed batch freeze heat exchangers operated in a semi-batch, counter current mode, the operation of which will now be described in detail. After a suitable amount of time passes with solidifier X14 in the above configuration, the effective order of the batch freeze heat exchangers within X14 can be rearranged such that the subsequent (or downstream) heat exchanger is contacted earlier with the incoming gas stream at a higher temperature and higher concentration of $CO_2$. Some of the $CO_2$ within the stream can be deposited or frozen onto the existing layer of $CO_2$ frozen onto the surface of the exchanger. Subsequently, after additional time, the same exchanger can be reconfigured to again contact yet warmer and $CO_2$-richer incoming gas, effectively "moving" it upstream in the series of batch freeze exchangers. The specific number of batch freeze heat exchangers is not limited and will often result from an optimization study based on site-specific and facility-specific factors.

In this embodiment, the "moving" of a batch exchanger to an "upstream" position can be accomplished using a piping and valve system. Any suitable method can be used to transition the individual batch freeze heat exchangers from one location to another within the counter-current heat exchange train. In this embodiment, a rotary valve arrangement in which the sequence and rotational movement of the rotary valve can predispose the batch freeze heat exchanger to most efficiently capture the most amount of $CO_2$ throughout the cycle can be used. Adjustment in timing the rotary valve from one position to the next can be varied to compensate for flow rate turndown and other similar factors. Other methods of transitioning the batch freeze heat exchangers from one position to the other are equally valid and all manner of methods are covered by the spirit of this invention.

According to this embodiment wherein solidifier X14 comprises a plurality of batch freeze heat exchangers, operated counter-currently, the final location in the sequence of batch freeze heat exchangers is the first point of contact for the gas stream exiting the first separation zone, which has a temperature upon entry into solidifier X14 of about −64° F. The gas in conduit 11 can be saturated with $CO_2$ at the partial pressure of $CO_2$ in the gas stream. Thus, as the temperature of the gas stream is decreased, the $CO_2$ can be frozen out of the gas stream and collect on the previously-frozen (e.g., solid) $CO_2$ on the exterior surface of the batch freeze heat exchanger. Once the appropriate contact time has passed, the batch freeze exchanger can be regenerated by passing a warmer stream of refrigerant through the other side (e.g., the tube side) of the heat exchanger. The cross connection for providing warm, pressurized refrigerant to X14 is not shown on FIG. 6*a* for simplicity. This warm pressurized refrigerant applied to the fully laden batch freeze exchanger can cause some of the initial $CO_2$ deposit to melt, thereby detaching the outer layers of frozen $CO_2$ to move downwardly along a plurality of slightly tapered cylindrical post via gravity to the bottom of the vertically-oriented vessel. The resulting rings (or hollow tubes) of solid $CO_2$ can then drop into a lockhopper X15, as shown in FIG. 6*a*. The regenerated heat exchanger can then be returned to service, at the "back end" of the heat exchanger train, to contact the coldest gas stream having the lowest concentration of $CO_2$ (e.g., the final heat exchange location), as described previously.

According to this embodiment, the temperature of the gas exiting the heat exchange train (e.g., the final batch freeze heat exchanger that has been most recently regenerated) is approximately −130° F. to thereby ensure a sufficient amount of $CO_2$ has been removed from the gas stream in conduit 11. Because solid $CO_2$ has a low thermal conductivity, the temperature of the cold (e.g., vaporizing) refrigerant, typically utilized on the tube side of a shell-and-tube heat exchanger, can be about −150° F., thereby providing a driving force of about 20° F. through the batch freeze exchanger and the layer of frozen $CO_2$ building on to the exchanger. In this embodiment, the gradual cooling of the residual gas stream withdrawn from first separation zone via conduit 11 can begin at about −64° F., as it enters the first batch freeze heat exchanger and end at about −130° F. as it exits the last batch freeze heat exchanger, progressively layering solidified $CO_2$ onto the surface of the exchangers, as the gas flows through sequenced, cooler units.

As shown in FIG. 6*a*, the hollow rings of solid frozen $CO_2$ can enter the lock hopper X15, which is positioned at a vertical elevation below the batch freeze heat exchanger which has most recently been regenerated. To transfer the frozen $CO_2$ into the $CO_2$ melter X16, located below lockhopper X15, the top isolation valve of X15 (not shown on FIG. 6*a*) can be closed prior to opening the bottom isolation valve of lockhopper X15 (not shown on FIG. 6*a*), thereby allowing the solidified rings or tubes to fall downwardly into the melter X16. Once the lockhopper X15 has been emptied, the bottom isolation valve can be closed and the top valve reopened to position lockhopper X15 to accept a new batch of frozen $CO_2$ from solidifier X14.

In this embodiment, $CO_2$ melter X16 can be a pressurized vessel operated at or above the triple point pressure of $CO_2$. The $CO_2$ melter can, in this embodiment, be operable to allow the solid $CO_2$ to melt, thereby forming a $CO_2$ liquid, while preventing sublimation directly into a gas. According to this embodiment, sublimation can be avoided when the pressure of the $CO_2$ melter X16 is above the triple point pressure of $CO_2$ and heat is added to the vessel. In this embodiment, during the operation of melter X16, a heel (or residual liquid volume) of liquid $CO_2$ is made to remain in the vessel. This can aide heat transferred via submerged heating coils positioned within the interior of the melter to the incoming solid $CO_2$ rings. In this embodiment, the rate of liquid $CO_2$ produced from melter X16 or the level of residual liquid $CO_2$ in melter X16 can be controlled by adjusting a level-controlled valve to open as the solid $CO_2$ melts to maintain the level of liquid $CO_2$ within melter X16 at a set point (not shown on FIG. 6*a*)

As shown in FIG. 6*a*, the vapor refrigerant stream withdrawn from solidifier X14 passes to a first and a second stage ethylene gas recompression equipment X22 and X23. Cooler X24 is a compressed off-gas exchanger designed to cool the ethylene refrigerant gas to a temperature of about −2° F. via core exchanger X24, which is located in kettle X42, shown in FIG. 6*b* as being served by medium-pressure propane refrigerant. As shown in FIG. 6*a*, X25 is the third stage of the ethylene compressor and core exchanger X26 is used to cool the ethylene to a temperature of −2° F. via kettle X42. The final cooling and condensing of ethylene is carried out using cooling sources from two services in parallel: (1) melting solid $CO_2$ in melter X16 and/or (2) core exchanger X27 located within kettle X44, shown in FIG. 6*b*, for condensing ethylene at −38° F.

The remainder of the refrigeration circuits can be configured to operate in a analogous manner to those previously described with respect to FIGS. 4*a* and 4*b*, with the following exceptions. First propane kettle X38 can include the following core exchangers: (1) a core for the feed gas upstream a mole sieve dryer located prior to the facility shown in FIGS. 6*a* and 6*b* (core not shown in FIG. 6*a* or 6*b*, See FIG. 2) and (2) a core utilized during the selective sulfur removal process (e.g., SELEXOL process) located upstream of the facility in FIGS. 6*a* and 6*b*, See FIG. 2 (core not shown). Second propane kettle X42 includes the following core exchangers: (1) a core exchanger for use in the upstream sulfur removal process (not shown, See FIG. 2); (2) core exchanger X2; (3) core exchanger X26; and (4) overhead condenser core exchanger X30. Third propane kettle includes the following core exchangers: (1) core exchanger X4; (2) core exchanger X24; and (3) core exchanger X27, which can be used in the cascade system as an ethylene condenser.

This embodiment, the $CO_2$ recovery facility depicted in FIGS. 6*a* and 6*b* can include a two-stage ethylene refrigeration cycle. High-pressure ethylene kettle X18, shown in FIG. 6*a*, utilizes core exchangers X9 for cooling the process fluid to −64° F. The vaporizing refrigerant can have a temperature of about −68° F. to maintain an approximately 4° F. approach temperature. As discussed previously, minimizing or avoiding cold spots in this exchanger can be important and, in one embodiment, it may be desirable to control the temperature of the $CO_2$ therein to a temperature warmer than −68° F. In the embodiment shown in FIG. 6*a*, ethylene refrigeration cycle also includes a low-pressure ethylene refrigerant vessel X20. In this embodiment, kettle X20 includes the refrigerant that serves the batch freeze exchangers utilized within solidifier X14, described in detail previously. Because the atmospheric boiling point of ethylene is −150° F., this is a lower level of refrigeration available than when utilizing ethane as a second-stage refrigerant in the cascade cycle shown in FIGS. 6*a* and 6*b*.

Turning again to FIG. 6*b*, X45, X46, and X47 represent respective low, medium, and high-pressure stages of the propane compressor utilized in the propane refrigeration cycle, while X49 is the propane condenser exchanging heat with cooling water or, optionally, the hydrogen stream in conduit 54, which can ultimately be utilized in a Brayton cycle gas turbine, as discussed previously. As shown in FIG. 6*a*, the pressure of horizontally-oriented phase separator X12 flashes a portion of the light ends from the entering stream and the liquid $CO_2$ leaving separator X12 is pumped via booster pump X13. As discussed previously, the discharge pressure of pump X13 is be selected to optimize heat recovery in X1 and X3 of the facility shown in FIGS. 6*a* and 6*b*.

According to this embodiment, the recovered cold energy streams can be designed to minimize flow rate of refrigerant, thereby minimizing compressor power. For example, additional coldness can be recovered in heat exchangers X37, X40 and X43. In this embodiment, additional heat can be exchanged through X48 and the $CO_2$ reboiler X34A with propane sub-cooler X34B. Other alternative uses for the recovered cold energy are also contemplated. The above-described arrangement and operation represent embodiments of the present invention, and other configurations and methods of operation are contemplated and deemed to be within the scope of the present invention.

Various aspects of one or more embodiments of the present invention can be further illustrated and described by the following Examples. It should be understood, however, that these Examples are included merely for purposes of illustration and are not intended to limit the scope of the invention, unless otherwise specifically indicated.

EXAMPLES

Example 1

Simulation of a $CO_2$ Recovery Facility Utilizing an Absorption Stage

The system depicted in FIGS. 4*a* and 4*b* was modeled using the PD-Plus Chemical Process Simulator (available from Deerhaven Technical Software, Moultonborough, N.H.). Table 5, below, presents the Heat & Material Balance (HMB) obtained from the simulation of the $CO_2$ recovery facility that utilizes an absorption stage in the second separation zone.

TABLE 5

Heat and Material Balance for $CO_2$ Recovery Facility Utilizing Absorption Stage (FIGS. 4a and 4b)

| Stream Number | 1 | 2 | 3A | 3 | 4 |
|---|---|---|---|---|---|
| Temperature (° F.) | 45.7 | 2.6 | −2 | −2.1 | −19.5 |
| Pressure (psia) | 659.2 | 651.2 | 643.2 | 643.2 | 635.2 |
| Fraction Liquid | 0 | 0 | 0 | 0 | 0.0536 |
| LBMOL/HR | | | | | |
| HYDROGEN | 68,164.30 | 68,164.30 | 68,164.30 | 69,155.80 | 68,164.30 |
| CARBON MONOXIDE | 1,031.10 | 1,031.10 | 1,031.10 | 1,064.00 | 1,031.10 |
| METHANE | 500.70 | 500.70 | 500.70 | 528.70 | 500.70 |
| CARBON DIOXIDE | 62,901.60 | 62,901.60 | 62,901.60 | 64,259.10 | 62,901.60 |
| NITROGEN | 4,683.90 | 4,683.90 | 4,683.90 | 4,865.60 | 4,683.90 |
| TOTAL | 137,281.60 | 137,281.60 | 137,281.60 | 139,873.20 | 137,281.60 |

| Stream Number | 5 | 6 | 7 | 8 | 9 |
|---|---|---|---|---|---|
| Temperature (° F.) | −38 | −38 | −38 | −40.1 | −40.2 |
| Pressure (psia) | 627.2 | 627.2 | 627.2 | 619.2 | 619.2 |
| Fraction Liquid | 0.2184 | 0 | 1 | 0.0141 | 0 |
| LBMOL/HR | | | | | |
| HYDROGEN | 68,164.30 | 67,531.60 | 632.70 | 67,531.60 | 67,499.20 |
| CARBON MONOXIDE | 1,031.10 | 1,008.60 | 22.60 | 1,008.60 | 1,007.40 |
| METHANE | 500.70 | 462.40 | 38.20 | 462.40 | 460.40 |
| CARBON DIOXIDE | 62,901.60 | 33,708.80 | 29,192.80 | 33,708.80 | 32,180.80 |
| NITROGEN | 4,683.90 | 4,586.80 | 97.10 | 4,586.80 | 4,581.80 |
| TOTAL | 137,281.60 | 107,298.20 | 29,983.40 | 107,298.20 | 105,729.60 |

| Stream Number | 10 | 11 | 12 | 13 | 14 | 15 | 16 | 22 | 23 | 24 |
|---|---|---|---|---|---|---|---|---|---|---|
| Temperature (° F.) | −40.2 | −64 | −64 | −64 | −2 | −55.7 | −28.4 | 90 | 45 | 2.6 |
| Pressure (psia) | 619.2 | 611.2 | 611.2 | 611.2 | 708 | 605 | 610 | 676 | 668 | 660 |
| Fraction Liquid | 1 | 0.1447 | 0 | 1 | 0 | 0 | 1 | 1 | 1 | 1 |
| LBMOL/HR | | | | | | | | | | |
| HYDROGEN | 32.40 | 67,499.20 | 67,209.10 | 290.10 | 991.50 | 67,083.80 | 124.60 | | | |
| CARBON MONOXIDE | 1.20 | 1,007.40 | 995.20 | 12.20 | 32.80 | 990.10 | 5.10 | | | |
| METHANE | 2.00 | 460.40 | 436.90 | 23.60 | 28.00 | 422.40 | 14.50 | | | |
| CARBON DIOXIDE | 1,527.90 | 32,180.80 | 17,264.10 | 14,916.70 | 1,357.50 | 1,687.90 | 15,654.50 | 78.30 | 78.30 | 78.30 |
| NITROGEN | 5.00 | 4,581.80 | 4,529.60 | 52.10 | 181.70 | 4,464.90 | 64.70 | | | |
| METHANOL | | | | | | 1.50 | 71,170.20 | 71,171.70 | 71,171.70 | 71,171.70 |
| TOTAL | 1,568.50 | 105,729.60 | 90,434.90 | 15,294.70 | 2,591.50 | 74,650.60 | 87,033.60 | 71,250.00 | 71,250.00 | 71,250.00 |

| Stream Number | 25 | 26 | 27 | 28 | 29 | 30 | 31 | 32 | 33 | 34 |
|---|---|---|---|---|---|---|---|---|---|---|
| Temperature (° F.) | −2 | −19.5 | −38 | −40.1 | −64 | −42 | −42 | −39.4 | −39.4 | −39.4 |
| Pressure (psia) | 652 | 644 | 636 | 628 | 620 | 603.2 | 597 | 575 | 575 | 575 |
| Fraction Liquid | 1 | 1 | 1 | 1 | 1 | 1 | 0 | 0.9971 | 1 | 0 |
| LBMOL/HR | | | | | | | | | | |
| HYDROGEN | | | | | | 290.10 | 67,083.80 | 955.20 | 870.50 | 84.70 |
| CARBON MONOXIDE | | | | | | 12.20 | 990.10 | 36.00 | 34.60 | 1.40 |
| METHANE | | | | | | 23.60 | 422.40 | 63.80 | 63.10 | 0.70 |
| CARBON DIOXIDE | 78.30 | 78.30 | 78.30 | 78.30 | 78.30 | 14,916.70 | 1,687.90 | 45,637.50 | 45,592.50 | 45.00 |
| NITROGEN | | | | | | 52.10 | 4,464.90 | 154.20 | 148.00 | 6.30 |
| METHANOL | 71,171.70 | 71,171.70 | 71,171.70 | 71,171.70 | 71,171.70 | | 1.50 | | | |
| TOTAL | 71,250.00 | 71,250.00 | 71,250.00 | 71,250.00 | 71,250.00 | 15,294.70 | 74,650.60 | 46,846.70 | 46,708.70 | 138.10 |

| Stream Number | 35 | 36 | 37 | 38 | 39 | 40 | 41 | 42 | 44 |
|---|---|---|---|---|---|---|---|---|---|
| Temperature (° F.) | −38.1 | −42.2 | −8 | −8 | −8 | 41.3 | 41.3 | 65 | 70 |
| Pressure (psia) | 718 | 575 | 710 | 567 | 602 | 594 | 559 | 208 | 200 |
| Fraction Liquid | 1 | 0 | 1 | 0 | 1 | 1 | 0 | 0.9464 | 0 |
| LBMOL/HR | | | | | | | | | |
| HYDROGEN | 870.50 | 67,168.40 | 870.50 | 67,168.40 | 124.60 | 124.60 | 67,168.40 | 124.60 | 121.80 |
| CARBON MONOXIDE | 34.60 | 991.50 | 34.60 | 991.50 | 5.10 | 5.10 | 991.50 | 5.10 | 4.90 |
| METHANE | 63.10 | 423.00 | 63.10 | 423.00 | 14.50 | 14.50 | 423.00 | 14.50 | 12.30 |
| CARBON DIOXIDE | 45,592.50 | 1,732.90 | 45,592.50 | 1,732.90 | 15,654.50 | 15,654.50 | 1,732.90 | 15,654.50 | 5,457.20 |
| NITROGEN | 148.00 | 4,471.20 | 148.00 | 4,471.20 | 64.70 | 64.70 | 4,471.20 | 64.70 | 59.70 |
| METHANOL | | 1.50 | | 1.50 | 71,170.20 | 71,170.20 | 1.50 | 71,170.20 | 61.00 |
| TOTAL | 46,708.70 | 74,788.50 | 46,708.70 | 74,788.50 | 87,033.60 | 87,033.60 | 74,788.50 | 87,033.60 | 5,716.90 |

TABLE 5-continued

Heat and Material Balance for $CO_2$ Recovery Facility Utilizing Absorption Stage (FIGS. 4a and 4b)

| Stream Number | 45 | 46 | 47 | 48 | 49 |
|---|---|---|---|---|---|
| Temperature (° F.) | 70 | 70.4 | 255 | 255 | 255 |
| Pressure (psia) | 200 | 318 | 310 | 310 | 310 |
| Fraction Liquid | 1 | 1 | 0.8667 | 0 | 1 |
| LBMOL/HR | | | | | |
| HYDROGEN | 2.80 | 2.80 | 2.80 | 2.60 | 0.10 |
| CARBON MONOXIDE | 0.20 | 0.20 | 0.20 | 0.20 | |
| METHANE | 2.20 | 2.20 | 2.20 | 1.90 | 0.30 |
| CARBON DIOXIDE | 10,197.40 | 10,197.40 | 10,197.40 | 6,691.90 | 3,505.50 |
| NITROGEN | 5.00 | 5.00 | 5.00 | 4.60 | 0.50 |
| METHANOL | 71,109.20 | 71,109.20 | 71,109.20 | 4,140.20 | 66,969.00 |
| TOTAL | 81,316.80 | 81,316.80 | 81,316.80 | 10,841.40 | 70,475.40 |

| Stream Number | 50 | 51 | 52 | 53 | 54 |
|---|---|---|---|---|---|
| Temperature (° F.) | 95 | 194 | 131.8 | 216.9 | 95 |
| Pressure (psia) | 300 | 290 | 295 | 290 | 282 |
| Fraction Liquid | 0.9996 | 0 | 0 | 0.0068 | 0.2545 |
| LBMOL/HR | | | | | |
| HYDROGEN | 0.20 | 0.30 | 121.80 | 124.70 | 124.70 |
| CARBON MONOXIDE | | | 4.90 | 5.10 | 5.10 |
| METHANE | 0.10 | 0.40 | 12.30 | 14.60 | 14.60 |
| CARBON DIOXIDE | 913.00 | 4,379.50 | 5,457.20 | 16,528.50 | 16,528.50 |
| NITROGEN | 0.20 | 0.70 | 59.70 | 65.00 | 65.00 |
| METHANOL | 4,817.00 | 779.20 | 61.00 | 4,980.30 | 4,980.30 |
| TOTAL | 5,730.50 | 5,160.10 | 5,716.90 | 21,718.20 | 21,718.20 |

| Stream Number | 55 | 56 | 57 | 58 | 59 | 60 | 61 | 62 | 63 | 64 |
|---|---|---|---|---|---|---|---|---|---|---|
| Temperature (° F.) | 95 | 95 | 261.6 | 95 | 95 | 95 | 95.1 | 329.8 | 107.9 | 100 |
| Pressure (psia) | 282 | 282 | 725 | 717 | 717 | 717 | 300 | 297 | 289 | 714 |
| Fraction Liquid | 0 | 1 | 0 | 0.0125 | 0 | 1 | 1 | 1 | 1 | 0 |
| LBMOL/HR | | | | | | | | | | |
| HYDROGEN | 124.60 | 0.10 | 124.60 | 124.60 | 124.60 | | 0.10 | | | 124.60 |
| CARBON MONOXIDE | 5.10 | | 5.10 | 5.10 | 5.10 | | | | | 5.10 |
| METHANE | 14.50 | 0.10 | 14.50 | 14.50 | 14.50 | | 0.10 | | | 14.50 |
| CARBON DIOXIDE | 15,707.60 | 820.90 | 15,707.60 | 15,707.60 | 15,615.50 | 92.10 | 820.90 | 39.80 | 39.80 | 15,615.50 |
| NITROGEN | 64.80 | 0.20 | 64.80 | 64.80 | 64.70 | | 0.20 | | | 64.70 |
| METHANOL | 273.80 | 4,706.50 | 273.80 | 273.80 | 163.30 | 110.50 | 4,706.50 | 71,010.20 | 71,010.20 | |
| TOTAL | 16,190.40 | 5,527.80 | 16,190.40 | 16,190.40 | 15,987.70 | 202.60 | 5,527.80 | 71,050.00 | 71,050.00 | 15,824.40 |

| Stream Number | 68 | 69 | 97 | 98 |
|---|---|---|---|---|
| Temperature (° F.) | 41.3 | 55.8 | 85.5 | 40.2 |
| Pressure (psia) | 710 | 713 | 2200 | 216 |
| Fraction Liquid | 0.9325 | 1 | 0 | 0.9837 |
| LBMOL/HR | | | | |
| HYDROGEN | 995.10 | 3.60 | 3.60 | 124.60 |
| CARBON MONOXIDE | 39.60 | 6.80 | 6.80 | 5.10 |
| METHANE | 77.60 | 49.60 | 49.60 | 14.50 |
| CARBON DIOXIDE | 61,208.00 | 59,850.60 | 59,850.60 | 15,654.50 |
| NITROGEN | 212.70 | 31.00 | 31.00 | 64.70 |
| METHANOL | | | | 71,170.20 |
| TOTAL | 62,533.00 | 59,941.60 | 59,941.60 | 87,033.60 |

| Stream Number | 70 | 71 | 75 | 76 | 77 |
|---|---|---|---|---|---|
| Temperature (° F.) | −38 | −53 | −68 | −42.6 | 27.5 |
| Pressure (psia) | 116.7 | 108.7 | 65.043 | 60.043 | 116.8 |
| Fraction Liquid | 1 | 1 | 0 | 0 | 0 |
| LBMOL/HR | | | | | |
| ETHANE | 27,699.90 | 27,699.90 | 27,699.90 | 27,699.90 | 27,699.90 |
| PROPANE | | | | | |
| TOTAL | 27,699.90 | 27,699.90 | 27,699.90 | 27,699.90 | 27,699.90 |

TABLE 5-continued

| Heat and Material Balance for $CO_2$ Recovery Facility Utilizing Absorption Stage (FIGS. 4a and 4b) | | | | | |
|---|---|---|---|---|---|
| Stream Number | 78 | 80 | 81 | 82 | 83 |
| Temperature (° F.) | −38 | 95 | 78.3 | 55.1 | 41 |
| Pressure (psia) | 116.7 | 176.62 | 168.62 | 160.62 | 79.589 |
| Fraction Liquid | 1 | 1 | 1 | 1 | 0 |
| LBMOL/HR | | | | | |
| ETHANE | 27,699.90 | | | | |
| PROPANE | | 102,552.80 | 102,552.80 | 102,552.80 | 39,889.40 |
| TOTAL | 27,699.90 | 102,552.80 | 102,552.80 | 102,552.80 | 39,889.40 |
| Stream Number | 84 | 85 | 86 | 90 | 91 |
| Temperature (° F.) | 41 | −6 | −6 | −42 | 16.9 |
| Pressure (psia) | 79.589 | 33.911 | 33.911 | 15.339 | 34 |
| Fraction Liquid | 1 | 0 | 1 | 0 | 0 |
| LBMOL/HR | | | | | |
| PROPANE | 62,663.50 | 18,164.70 | 44,498.80 | 44,498.80 | 44,498.80 |
| METHANOL | | | | | |
| TOTAL | 62,663.50 | 18,164.70 | 44,498.80 | 44,498.80 | 44,498.80 |
| Stream Number | 92 | 93 | 94 | 95 | 96 |
| Temperature (° F.) | 10.3 | 78.5 | 64.1 | 135.8 | 95 |
| Pressure (psia) | 33.911 | 80 | 79.589 | 178.62 | 176.62 |
| Fraction Liquid | 0 | 0 | 0 | 0 | 1 |
| LBMOL/HR | | | | | |
| PROPANE | 62,663.50 | 62,663.50 | 102,552.80 | 102,552.80 | 102,552.80 |
| METHANOL | | | | | |
| TOTAL | 62,663.50 | 62,663.50 | 102,552.80 | 102,552.80 | 102,552.80 |

Example 2

Simulation of a $CO_2$ Recovery Facility Utilizing an Adsorption Stage

The system depicted in FIGS. 5*a* and 5*b* was modeled using the PD-Plus Chemical Process Simulator (available from Deerhaven Technical Software, Moultonborough, N.H.). Table 6, below, presents the Heat & Material Balance (HMB) obtained from the simulation of the $CO_2$ recovery facility that utilizes an adsorption stage in the second separation zone.

TABLE 6

| Heat and Material Balance for $CO_2$ Recovery Facility Utilizing Adsorption Stage (FIGS. 5a and 5b) | | | | | |
|---|---|---|---|---|---|
| Stream Number | 1 | 2 | 3 | 4 | 5 |
| Temperature (° F.) | 45.7 | 3.9 | −2 | −17.8 | −38 |
| Pressure (psia) | 659.2 | 651.2 | 643.2 | 635.2 | 627.2 |
| Liquid Fraction | 0 | 0 | 0 | 0.0312 | 0.2184 |
| HYDROGEN | 68,164.30 | 68,164.30 | 68,164.30 | 68,164.30 | 68,164.30 |
| CARBON MONOXIDE | 1,031.10 | 1,031.10 | 1,031.10 | 1,031.10 | 1,031.10 |
| METHANE | 500.70 | 500.70 | 500.70 | 500.70 | 500.70 |
| CARBON DIOXIDE | 62,901.60 | 62,901.60 | 62,901.60 | 62,901.60 | 62,901.60 |
| NITROGEN | 4,683.90 | 4,683.90 | 4,683.90 | 4,683.90 | 4,683.90 |
| TOTAL | 137,281.60 | 137,281.60 | 137,281.60 | 137,281.60 | 137,281.60 |
| Stream Number | 6 | 7 | 8 | 9 | 10 |
| Temperature (° F.) | −38 | −38 | −42.2 | −42.2 | −64 |
| Pressure (psia) | 627.2 | 627.2 | 619.2 | 619.2 | 611.2 |
| Liquid Fraction | 0 | 1 | 0.0308 | 0 | 0.1304 |
| HYDROGEN | 67,531.60 | 632.70 | 67,531.60 | 67,463.50 | 67,463.50 |
| CARBON MONOXIDE | 1,008.60 | 22.60 | 1,008.60 | 1,006.10 | 1,006.10 |
| METHANE | 462.40 | 38.20 | 462.40 | 458.10 | 458.10 |
| CARBON DIOXIDE | 33,708.80 | 29,192.80 | 33,708.80 | 30,487.50 | 30,487.50 |
| NITROGEN | 4,586.80 | 97.10 | 4,586.80 | 4,576.10 | 4,576.10 |
| TOTAL | 107,298.20 | 29,983.40 | 107,298.20 | 103,991.30 | 103,991.30 |

TABLE 6-continued

Heat and Material Balance for $CO_2$ Recovery Facility Utilizing Adsorption Stage (FIGS. 5a and 5b)

| Stream Number | 11 | 12 | 13 | 21 | 22 |
|---|---|---|---|---|---|
| Temperature (° F.) | −42.2 | −64 | −64 | 46 | 3.9 |
| Pressure (psia) | 619.2 | 611.2 | 611.2 | 667 | 659 |
| Liquid Fraction | 1 | 0 | 1 | 0 | 0.0291 |
| HYDROGEN | 68.20 | 67,206.30 | 257.20 | 6,720.60 | 6,720.60 |
| CARBON MONOXIDE | 2.50 | 995.20 | 10.80 | 995.20 | 995.20 |
| METHANE | 4.30 | 437.20 | 20.90 | 423.20 | 423.20 |
| CARBON DIOXIDE | 3,221.30 | 17,264.10 | 13,223.40 | 17,264.10 | 17,264.10 |
| NITROGEN | 10.70 | 4,529.90 | 46.20 | 2,930.80 | 2,930.80 |
| TOTAL | 3,307.00 | 90,432.70 | 13,558.50 | 28,333.90 | 28,333.90 |

| Stream Number | 23 | 24 | 25 | 26 | 27 |
|---|---|---|---|---|---|
| Temperature (° F.) | −2 | −17.8 | −38 | −38 | −38 |
| Pressure (psia) | 651 | 643 | 635 | 635 | 635 |
| Liquid Fraction | 0.1299 | 0.3202 | 0.4541 | 0 | 1 |
| HYDROGEN | 6,720.60 | 6,720.60 | 6,720.60 | 6,525.20 | 195.40 |
| CARBON MONOXIDE | 995.20 | 995.20 | 995.20 | 930.10 | 65.20 |
| METHANE | 423.20 | 423.20 | 423.20 | 338.20 | 85.00 |
| CARBON DIOXIDE | 17,264.10 | 17,264.10 | 17,264.10 | 4,926.40 | 12,337.70 |
| NITROGEN | 2,930.80 | 2,930.80 | 2,930.80 | 2,748.70 | 182.10 |
| TOTAL | 28,333.90 | 28,333.90 | 28,333.90 | 15,468.60 | 12,865.40 |

| Stream Number | 28 | 29 | 30 | 31 | 32 | 33 | 41 | 42 | 43 | 44 |
|---|---|---|---|---|---|---|---|---|---|---|
| Temperature (° F.) | −42.2 | −42.2 | −64 | −42.2 | −64 | −64 | −64 | −59.6 | −42 | −42 |
| Pressure (psia) | 627 | 627 | 619 | 627 | 619 | 619 | 611.2 | 611.2 | 603.2 | 603.2 |
| Liquid Fraction | 0.0314 | 0 | 0.1332 | 1 | 0 | 1 | 1 | 1 | 1 | 0 |
| HYDROGEN | 6,525.20 | 6,518.00 | 6,518.00 | 7.20 | 6,490.50 | 27.50 | 284.60 | 360.00 | 360.00 | 67,206.30 |
| CARBON MONOXIDE | 930.10 | 927.60 | 927.60 | 2.50 | 916.90 | 10.70 | 21.60 | 26.50 | 26.50 | 995.20 |
| METHANE | 338.20 | 334.90 | 334.90 | 3.30 | 319.10 | 15.90 | 36.80 | 44.40 | 44.40 | 437.20 |
| CARBON DIOXIDE | 4,926.40 | 4,460.10 | 4,460.10 | 466.30 | 2,548.60 | 1,911.50 | 15,134.90 | 18,822.60 | 18,822.60 | 17,264.10 |
| NITROGEN | 2,748.70 | 2,741.80 | 2,741.80 | 6.90 | 2,712.00 | 29.80 | 76.00 | 93.60 | 93.60 | 4,529.90 |
| TOTAL | 15,468.60 | 14,982.40 | 14,982.40 | 486.20 | 12,987.10 | 1,995.40 | 15,553.90 | 19,347.10 | 19,347.10 | 90,432.70 |

| Stream Number | 45 | 46 | 47 | 48 | 49 | 50 | 51 | 52 | 53 | 54 |
|---|---|---|---|---|---|---|---|---|---|---|
| Temperature (° F.) | −42 | −39.2 | −39.2 | −39.2 | −38.2 | −6 | −6 | −6 | 13.4 | 41.8 |
| Pressure (psia) | 611 | 603.2 | 593.2 | 593.2 | 708.2 | 700.2 | 595.2 | 603 | 692.2 | 587.2 |
| Liquid Fraction | 0 | 0.9988 | 0 | 1 | 1 | 1 | 0 | 0 | 1 | 0 |
| HYDROGEN | 6,490.50 | 1,188.10 | 72.70 | 1,115.50 | 1,115.50 | 1,115.50 | 67,206.30 | 6,490.50 | 1,115.50 | 67,206.30 |
| CARBON MONOXIDE | 916.90 | 114.30 | 3.00 | 111.30 | 111.30 | 111.30 | 995.20 | 916.90 | 111.30 | 995.20 |
| METHANE | 319.10 | 167.60 | 1.20 | 166.40 | 166.40 | 166.40 | 437.20 | 319.10 | 166.40 | 437.20 |
| CARBON DIOXIDE | 2,548.60 | 60,353.00 | 41.30 | 60,311.70 | 60,311.70 | 60,311.70 | 17,264.10 | 2,548.60 | 60,311.70 | 17,264.10 |
| NITROGEN | 2,712.00 | 372.80 | 10.40 | 362.50 | 362.50 | 362.50 | 4,529.90 | 2,712.00 | 362.50 | 4,529.90 |
| TOTAL | 12,987.10 | 62,195.80 | 128.60 | 62,067.40 | 62,067.40 | 62,067.40 | 90,432.70 | 12,987.10 | 62,067.40 | 90,432.70 |

| Stream Number | 55 | 56 | 57 | 58 | 59 | 60 | 61 | 62 | 63 | 64 |
|---|---|---|---|---|---|---|---|---|---|---|
| Temperature (° F.) | 41.8 | 50 | 48 | 200.7 | 95 | 261.7 | 95 | −2 | −11.2 | 55.9 |
| Pressure (psia) | 595 | 576.9 | 114.7 | 282 | 277 | 680 | 675 | 708 | 593.2 | 713 |
| Liquid Fraction | 0 | 0 | 0 | 0 | 0 | 0 | 0 | 0 | 0.0031 | 1 |
| HYDROGEN | 6,490.50 | 60,485.70 | 6,720.60 | 6,720.60 | 6,720.60 | 6,720.60 | 6,720.60 | 1,115.40 | 1,188.10 | |
| CARBON MONOXIDE | 916.90 | | 995.20 | 995.20 | 995.20 | 995.20 | 995.20 | 110.80 | 113.80 | 0.50 |
| METHANE | 319.10 | 14.00 | 423.20 | 423.20 | 423.20 | 423.20 | 423.20 | 49.70 | 50.90 | 116.70 |
| CARBON DIOXIDE | 2,548.60 | | 17,264.10 | 17,264.10 | 17,264.10 | 17,264.10 | 17,264.10 | 1,815.30 | 1,856.60 | 58,496.40 |
| NITROGEN | 2,712.00 | 1,599.00 | 2,930.80 | 2,930.80 | 2,930.80 | 2,930.80 | 2,930.80 | 361.40 | 371.80 | 1.00 |
| TOTAL | 12,987.10 | 62,098.70 | 28,333.90 | 28,333.90 | 28,333.90 | 28,333.90 | 28,333.90 | 3,452.60 | 3,581.20 | 58,614.60 |

| Stream Number | 65 | 66 | 67 | 68 | 69 |
|---|---|---|---|---|---|
| Temperature (° F.) | 56.9 | 59.7 | 91.6 | 44.1 | 13.6 |
| Pressure (psia) | 758 | 750 | 2200 | 576.9 | 710 |
| Liquid Fraction | 1 | 1 | 0 | 0 | 1 |
| HYDROGEN | | | | 61,673.70 | 1,115.50 |
| CARBON MONOXIDE | 0.50 | 0.50 | 0.50 | 113.80 | 111.30 |
| METHANE | 116.70 | 116.70 | 116.70 | 64.90 | 166.40 |
| CARBON DIOXIDE | 58,496.40 | 58,496.40 | 58,496.40 | 1,856.60 | 60,311.70 |
| NITROGEN | 1.00 | 1.00 | 1.00 | 1,970.90 | 362.50 |
| TOTAL | 58,614.60 | 58,614.60 | 58,614.60 | 65,679.90 | 62,067.40 |

TABLE 6-continued

Heat and Material Balance for $CO_2$ Recovery Facility Utilizing Adsorption Stage (FIGS. 5a and 5b)

| Stream Number | 70 | 71 | 72 | 73 | 74 | 75 | 76 | 77 | 78 | 79 |
|---|---|---|---|---|---|---|---|---|---|---|
| Temperature (° F.) | −38 | −52 | −68 | −68 | −68 | −68 | −44.3 | 32.1 | −2 | −38 |
| Pressure (psia) | 117 | 112 | 65.043 | 65.043 | 65.043 | 65.043 | 60.043 | 123.75 | 118.75 | 116.75 |
| Liquid Fraction | 1 | 1 | 0 | | 0 | 0 | 0 | 0 | 0 | 1 |
| ETHANE | 19,960.30 | 19,960.30 | 19,960.30 | | 19,960.30 | 19,960.30 | 19,960.30 | 19,960.30 | 19,960.30 | 19,960.30 |
| TOTAL | 19,960.30 | 19,960.30 | 19,960.30 | — | 19,960.30 | 19,960.30 | 19,960.30 | 19,960.30 | 19,960.30 | 19,960.30 |

| Stream Number | 80 | 81 | 82 | 83 | 84 |
|---|---|---|---|---|---|
| Temperature (° F.) | 95 | 91.6 | 59.8 | 41 | 41 |
| Pressure (psia) | 176.7 | 168.7 | 160.7 | 79.589 | 79.589 |
| Liquid Fraction | 1 | 0.9962 | 1 | 0 | 1 |
| PROPANE | 89,703.50 | 89,703.50 | 89,703.50 | 30,661.50 | 59,042.00 |
| TOTAL | 89,703.50 | 89,703.50 | 89,703.50 | 30,661.50 | 59,042.00 |

| Stream Number | 85 | 86 | 87 | 90 | 91 |
|---|---|---|---|---|---|
| Temperature (° F.) | −6 | −6 | −42 | −42 | 16.9 |
| Pressure (psia) | 33.911 | 33.911 | 15.339 | 15.339 | 34 |
| Liquid Fraction | 0 | 1 | 0 | 0 | 0 |
| PROPANE | 17,315.10 | 41,726.90 | 41,726.90 | 41,726.90 | 41,726.90 |
| TOTAL | 17,315.10 | 41,726.90 | 41,726.90 | 41,726.90 | 41,726.90 |

| Stream Number | 92 | 93 | 94 | 95 | 96 |
|---|---|---|---|---|---|
| Temperature (° F.) | 10.2 | 78.5 | 65.8 | 137.4 | 95 |
| Pressure (psia) | 33.911 | 80 | 79.589 | 178.62 | 176.62 |
| Liquid Fraction | 0 | 0 | 0 | 0 | 1 |
| PROPANE | 59,042.00 | 59,042.00 | 89,703.50 | 89,703.50 | 89,703.50 |
| TOTAL | 59,042.00 | 59,042.00 | 89,703.50 | 89,703.50 | 89,703.50 |

Example 3

Simulation of a $CO_2$ Recovery Facility Utilizing a Deliberate Freezing Stage The system depicted in FIGS. 6*a* and 6*b* was modeled using the PD-Plus Chemical Process Simulator (available from Deerhaven Technical Software, Moultonborough, N.H.). Table 7, below, presents the Heat & Material Balance (HMB) obtained from the simulation of the $CO_2$ recovery facility that utilizes a deliberate freezing stage in the second separation zone.

TABLE 7

Heat and Material Balance for $CO_2$ Recovery Facility Utilizing Freezing Stage (FIGS. 6a and 6b)

| Stream Number | 1 | 2 | 3 | 4 | 5 |
|---|---|---|---|---|---|
| Temperature (° F.) | 45.7 | 0.1 | −2 | −18.6 | −38 |
| Pressure (psia) | 659.2 | 651.2 | 643.2 | 635.2 | 627.2 |
| Liquid Fraction | 0 | 0 | 0 | 0.0424 | 0.2184 |
| HYDROGEN | 68,164.30 | 68,164.30 | 68,164.30 | 68,164.30 | 68,164.30 |
| CARBON MONOXIDE | 1,031.10 | 1,031.10 | 1,031.10 | 1,031.10 | 1,031.10 |
| METHANE | 500.70 | 500.70 | 500.70 | 500.70 | 500.70 |
| CARBON DIOXIDE | 62,901.60 | 62,901.60 | 62,901.60 | 62,901.60 | 62,901.60 |
| NITROGEN | 4,683.90 | 4,683.90 | 4,683.90 | 4,683.90 | 4,683.90 |
| TOTAL | 137,281.60 | 137,281.60 | 137,281.60 | 137,281.60 | 137,281.60 |

| Stream Number | 6 | 7 | 8 | 9 | 10 |
|---|---|---|---|---|---|
| Temperature (° F.) | −38 | −38 | −41.9 | −41.9 | −64 |
| Pressure (psia) | 627.2 | 627.2 | 619.2 | 619.2 | 611.2 |
| Liquid Fraction | 0 | 1 | 0.0287 | 0 | 0.1323 |
| HYDROGEN | 67,531.60 | 632.70 | 67,531.60 | 67,468.10 | 67,468.10 |
| CARBON MONOXIDE | 1,008.60 | 22.60 | 1,008.60 | 1,006.20 | 1,006.20 |
| METHANE | 462.40 | 38.20 | 462.40 | 458.40 | 458.40 |
| CARBON DIOXIDE | 33,708.80 | 29,192.80 | 33,708.80 | 30,707.70 | 30,707.70 |
| NITROGEN | 4,586.80 | 97.10 | 4,586.80 | 4,576.80 | 4,576.80 |
| TOTAL | 107,298.20 | 29,983.40 | 107,298.20 | 104,217.20 | 104,217.20 |

TABLE 7-continued

Heat and Material Balance for $CO_2$ Recovery Facility Utilizing Freezing Stage (FIGS. 6a and 6b)

| Stream Number | 11 | 12 | 15 | 16 | 17 | 20 | 21 | 22 | 23 | 24 |
|---|---|---|---|---|---|---|---|---|---|---|
| Temperature (° F.) | −64 | −64 | −69.9 | −41.9 | −54.4 | −130 | −130 | −84.2 | −69 | −38 |
| Pressure (psia) | 611.2 | 611.2 | 611.2 | 619.2 | 611.2 | 611.2 | 611.2 | 587.2 | 567.2 | 217.65 |
| Liquid Fraction | 0 | 1 | 1 | 1 | 1 | 0 | solid | 0 | 0 | 1 |
| HYDROGEN | 67,206.70 | 261.40 | 47.50 | 63.50 | 111.10 | 67,159.10 | | 67,159.10 | 67,159.10 | |
| CARBON MONOXIDE | 995.20 | 11.00 | 2.10 | 2.30 | 4.40 | 993.10 | | 993.10 | 993.10 | |
| METHANE | 437.20 | 21.30 | 4.20 | 4.00 | 8.20 | 433.00 | | 433.00 | 433.00 | |
| CARBON DIOXIDE | 17,264.20 | 13,443.50 | 2,512.20 | 3,001.10 | 5,513.30 | 642.00 | 14,110.00 | 642.00 | 642.00 | |
| NITROGEN | 4,529.90 | 47.00 | 8.90 | 10.00 | 18.90 | 4,521.00 | | 4,521.00 | 4,521.00 | |
| ETHYLENE | | | | | | | | | | 69,740.50 |
| TOTAL | 90,433.20 | 13,784.20 | 2,574.90 | 3,080.90 | 5,655.90 | 73,748.20 | 14,110.00 | 73,748.20 | 73,748.20 | 69,740.50 |

| Stream Number | 25 | 26 | 27 | 28 | 32 | 33 | 34 |
|---|---|---|---|---|---|---|---|
| Temperature (° F.) | −43.6 | −68 | −68 | −100 | −150 | 84.5 | −49.6 |
| Pressure (psia) | 201.65 | 127.53 | 127.53 | 104 | 17.282 | 128.53 | 126.53 |
| Liquid Fraction | 1 | 0 | 1 | 1 | 0 | 0 | 0 |
| ETHYLENE | 69,740.50 | 26,629.60 | 43,110.90 | 43,110.90 | 43,110.90 | 43,110.90 | 69,740.50 |
| TOTAL | 69,740.50 | 26,629.60 | 43,110.90 | 43,110.90 | 43,110.90 | 43,110.90 | 69,740.50 |

| Stream Number | 35 | 37 | 38 | 39 | 40 | 41 | 42 | 43 | 44 | 45 |
|---|---|---|---|---|---|---|---|---|---|---|
| Temperature (° F.) | 26.6 | −42 | −40.9 | −40.9 | −40.9 | −39.9 | −42 | −9 | −9 | 41.7 |
| Pressure (psia) | 225.65 | 603.2 | 603.2 | 593.2 | 593.2 | 708.2 | 559.2 | 551.2 | 700.2 | 543.2 |
| Liquid Fraction | 0 | 1 | 0.9993 | 0 | 1 | 1 | 0 | 0 | 1 | 0 |
| HYDROGEN | | 261.40 | 1,005.20 | 45.80 | 959.40 | 959.40 | 67,159.10 | 67,159.10 | 959.40 | 67,159.10 |
| CARBON MONOXIDE | | 11.00 | 38.00 | 0.70 | 37.30 | 37.30 | 993.10 | 993.10 | 37.30 | 993.10 |
| METHANE | | 21.30 | 67.60 | 0.30 | 67.30 | 67.30 | 433.00 | 433.00 | 67.30 | 433.00 |
| CARBON DIOXIDE | | 13,443.50 | 48,149.60 | 22.50 | 48,127.10 | 48,127.10 | 642.00 | 642.00 | 48,127.10 | 642.00 |
| NITROGEN | | 47.00 | 162.90 | 3.30 | 159.60 | 159.60 | 4,521.00 | 4,521.00 | 159.60 | 4,521.00 |
| ETHYLENE | 69,740.50 | | | | | | | | | |
| TOTAL | 69,740.50 | 13,784.20 | 49,423.30 | 72.60 | 49,350.70 | 49,350.70 | 73,748.20 | 73,748.20 | 49,350.70 | 73,748.20 |

| Stream Number | 46 | 47 | 48 | 49 | 51 | 52 | 53 | 54 | 55 | 71 |
|---|---|---|---|---|---|---|---|---|---|---|
| Temperature (° F.) | 15.7 | 15.9 | −2 | 54.4 | −38 | −2 | −44 | 38.9 | −43.8 | 72 |
| Pressure (psia) | 692.2 | 710 | 708 | 713 | 126.53 | 219.65 | 601.2 | 543.2 | 621.2 | 161 |
| Liquid Fraction | 1 | 1 | 0 | 1 | 0 | 0 | 1 | 0 | 1 | 1 |
| HYDROGEN | 959.40 | 959.40 | 936.30 | 23.10 | | | | 68,141.20 | | |
| CARBON MONOXIDE | 37.30 | 37.30 | 20.30 | 17.00 | | | | 1,014.10 | | |
| METHANE | 67.30 | 67.30 | 13.10 | 54.20 | | | | 446.50 | | |
| CARBON DIOXIDE | 48,127.10 | 48,127.10 | 1,161.20 | 46,965.90 | | | 14,110.00 | 1,825.70 | 14,110.00 | |
| NITROGEN | 159.60 | 159.60 | 90.90 | 68.70 | | | | 4,615.10 | | |
| ETHYLENE | | | | | 43,110.90 | 69,740.50 | | | | |
| PROPANE | | | | | | | | | | 114,979.50 |
| TOTAL | 49,350.70 | 49,350.70 | 2,221.80 | 47,128.90 | 43,110.90 | 69,740.50 | 14,110.00 | 76,042.60 | 14,110.00 | 114,979.50 |

| Stream Number | 72 | 73 | 74 | 75 | 76 |
|---|---|---|---|---|---|
| Temperature (° F.) | 68.9 | 41 | 41 | 33.6 | −6 |
| Pressure (psia) | 153 | 79.589 | 80 | 72 | 33.911 |
| Liquid Fraction | 1 | 0 | 1 | 1 | 0 |
| PROPANE | 114,979.50 | 34,814.30 | 80,165.20 | 80,165.20 | 17,162.90 |
| TOTAL | 114,979.50 | 34,814.30 | 80,165.20 | 80,165.20 | 17,162.90 |

| Stream Number | 77 | 78 | 82 | 83 | 84 |
|---|---|---|---|---|---|
| Temperature (° F.) | −6 | −17.9 | −42 | 16.9 | 12 |
| Pressure (psia) | 33.911 | 26.5 | 15.339 | 34 | 33.911 |
| Liquid Fraction | 1 | 0.9821 | 0 | 0 | 0 |
| PROPANE | 63,002.30 | 63,002.30 | 63,002.30 | 63,002.30 | 80,165.20 |
| TOTAL | 63,002.30 | 63,002.30 | 63,002.30 | 63,002.30 | 80,165.20 |

| Stream Number | 85 | 86 | 87 | 88 | 89 |
|---|---|---|---|---|---|
| Temperature (° F.) | 80.2 | 68.5 | 144.2 | 132.2 | 95 |
| Pressure (psia) | 80 | 79.589 | 186.62 | 178.62 | 176.62 |
| Liquid Fraction | 0 | 0 | 0 | 0 | 1 |

TABLE 7-continued

| Heat and Material Balance for $CO_2$ Recovery Facility Utilizing Freezing Stage (FIGS. 6a and 6b) | | | | | |
|---|---|---|---|---|---|
| CARBON DIOXIDE | | | | | |
| PROPANE | 80,165.20 | 114,979.50 | 114,979.50 | 114,979.50 | 114,979.50 |
| TOTAL | 80,165.20 | 114,979.50 | 114,979.50 | 114,979.50 | 114,979.50 |
| Stream Number | 90 | 91 | 92 | 93 | 94 |
| Temperature (° F.) | 72 | −12 | −10.8 | 35 | 56.5 |
| Pressure (psia) | 160.62 | 613.2 | 729.2 | 721.2 | 713.2 |
| Liquid Fraction | 1 | 1 | 1 | 1 | 1 |
| CARBON DIOXIDE | | 14,110.00 | 14,110.00 | 14,110.00 | 14,110.00 |
| PROPANE | 114,979.50 | | | | |
| TOTAL | 114,979.50 | 14,110.00 | 14,110.00 | 14,110.00 | 14,110.00 |
| Stream Number | 95 | 96 | 97 | 98 | 99 |
| Temperature (° F.) | 54.9 | 85.3 | 75.3 | 124.2 | 77.8 |
| Pressure (psia) | 713 | 2200 | 535.2 | 527.2 | 168.62 |
| Liquid Fraction | 1 | 0 | 0 | 0 | 1 |
| HYDROGEN | 23.10 | 23.10 | 68,141.20 | 68,141.20 | |
| CARBON MONOXIDE | 17.00 | 17.00 | 1,014.10 | 1,014.10 | |
| METHANE | 54.20 | 54.20 | 446.50 | 446.50 | |
| CARBON DIOXIDE | 61,075.90 | 61,075.90 | 1,825.70 | 1,825.70 | |
| NITROGEN | 68.70 | 68.70 | 4,615.10 | 4,615.10 | |
| ETHYLENE | | | | | |
| PROPANE | | | | | 114,979.50 |
| TOTAL | 61,238.90 | 61,238.90 | 76,042.60 | 76,042.60 | 114,979.50 |

Example 4

Comparison of Total Energy Usage Amongst Various Types of $CO_2$ Recovery Facilities Two commercial-scale $H_2S$ and $CO_2$ recovery facilities, each employing a DEPG-based two-stage process, were simulated using ProMax Software (available from Bryan Research & Engineering, Inc., in Bryan, Tex.). Plant A was simulated to have a specification CO level in the recovered $CO_2$ of about 1,000 ppm by volume and Plant B was modeled with a 200 ppm CO specification limit. The total energy usage for Plants A and B (including the energy required to compress the final $CO_2$ product to a discharge pressure of 2,200 psia) was calculated and compared with the energy usage for each of the inventive Plants 1-3 respectively described in Examples 1-3, above. Table 8, below, summarizes the total energy usage per $CO_2$ recovered, CO limit in the recovered $CO_2$, the total energy usage (in kW), and the total amount of $CO_2$ recovered (in lbmol/hr) for comparative Plants A and B and inventive Plants 1-3. The total energy usage encompasses all electrical loads for each plant, including the energy required for $H_2S$ removal, $CO_2$ capture, and $CO_2$ compression for each facility.

TABLE 8

Comparison of Energy Usage Amongst Various $CO_2$ Recovery Facilities

| Plant | Total Energy Usage per $CO_2$ Recovered (kW/lbmol) | CO limit in Captured $CO_2$ (ppm) | Total Power (kW) | Total $CO_2$ Recovered (lbmol/hr) |
|---|---|---|---|---|
| A | 2.74 | 1000 | 72,077 | 26,307 |
| B | 4.30 | 200 | 48,436 | 11,275 |
| 1 | 1.38 | 114 | 82,687 | 59,850 |
| 2 | 1.56 | 10 | 90,010 | 58,515 |
| 3 | 2.05 | 228 | 125,266 | 61,239 |

As shown in Table 8, an energy savings (in kW/lb-mol $CO_2$ recovered) is obtained by employing the processes and systems configured according to various embodiments of the present invention (e.g., Plants 1-3). Plant 1, which employs an absorption recovery stage, provides an energy savings of up to 68 percent, as compared to a conventional $CO_2$ recovery facility with similar CO limits (e.g., Plant B). Even Plant 3, which has the highest energy usage of the three inventive facilities, demonstrates a nearly 53 percent energy savings over conventional recovery facilities having similar CO limits. Even though Plant 3 does not meet the 200 ppm CO specification limit, as modeled herein, it should be noted that additional optimization can be conducted to improve this design. Plants 1 and 2 demonstrate higher levels of energy savings than the conventional technologies, as exemplified by comparative Plants A and B.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A method of recovering carbon dioxide ($CO_2$) in a liquid state from a high-pressure gas stream, said method comprising:

(a) cooling and partially condensing a high-pressure feed gas stream to thereby provide a condensed $CO_2$-rich fraction and an uncondensed $CO_2$-lean fraction;

(b) recovering a $CO_2$-rich liquid stream from at least a portion of said uncondensed $CO_2$-lean fraction wherein said recovering comprises one or more of the following steps—

(i) absorbing $CO_2$ from said uncondensed $CO_2$-lean fraction, and/or (ii) adsorbing $CO_2$ from said uncondensed $CO_2$-lean fraction, and/or (iii) freezing $CO_2$ from said uncondensed $CO_2$-lean fraction;

(c) combining at least a portion of said $CO_2$-rich liquid stream recovered in step (b) with at least a portion of said condensed $CO_2$-rich fraction to thereby provide a combined $CO_2$-rich stream; and (d) fractionating at least a portion of said combined $CO_2$-rich stream to separate non-$CO_2$ components therefrom and thereby provide a purified $CO_2$-rich liquid stream, wherein said high-pressure feed gas stream has a pressure of at least 60.4 psia, wherein said condensed $CO_2$-rich fraction and said combined $CO_2$-rich stream are liquid streams, wherein said purified $CO_2$-rich liquid stream has a pressure of at least 100 psia.

2. The process of claim 1, wherein said condensed $CO_2$-rich fraction has a pressure of at least 650 psia and said combined $CO_2$-rich stream has a pressure of at least 500 psia.

3. The process of claim 1, further comprising injecting said purified $CO_2$-rich liquid stream into a geological formation at a pressure greater than the average formation pressure of said geological formation.

4. The process of claim 1, wherein said high-pressure feed gas stream comprises a natural gas stream or a synthesis gas stream.

5. The process of claim 1, wherein said high-pressure feed gas stream has a pressure of at least 350 psia and comprises at least 20 mole percent $CO_2$ prior to said cooling of step (a).

6. The process of claim 1, wherein said high-pressure feed gas stream comprises water in an amount not more than 50 ppm by volume and less than 1 mole percent of one or more sulfur-containing compounds.

7. The process of claim 1, wherein said condensed $CO_2$-rich fraction comprises at least 10 percent of the total $CO_2$ originally present in said high-pressure feed gas stream and said uncondensed $CO_2$-lean fraction comprises at least about 50 percent of the total non-$CO_2$ components originally present in said high-pressure feed gas stream.

8. The process of claim 1, wherein the pressure of said uncondensed $CO_2$-lean fraction is within 200 pounds per square inch, (psi) of the pressure of said high-pressure feed gas stream prior to said cooling of step (a).

9. The process of claim 1, wherein at least a portion of said cooling of step (a) is provided by a cascade refrigeration system, a mixed refrigeration system, an acoustic refrigeration system, and/or an absorption refrigeration system.

10. The process of claim 1, wherein said recovering of step (b) comprises adsorbing and/or absorbing $CO_2$ from said uncondensed $CO_2$-lean fraction to thereby produce a $CO_2$-rich gaseous stream, wherein said recovering of step (b) includes compressing and/or cooling said $CO_2$-rich gaseous stream to form said $CO_2$-rich liquid stream having a pressure of at least 100 psig.

11. The process of claim 1, wherein said recovering of step (b) comprises adsorbing $CO_2$ from said uncondensed $CO_2$-lean fraction using a solid adsorbent material, wherein said adsorbing produces a $CO_2$-rich tail gas stream, wherein said recovering of step (b) comprises compressing and/or cooling at least a portion of said $CO_2$-rich tail gas stream to thereby provide said $CO_2$-rich liquid stream.

12. The process of claim 1, wherein said recovering of step (b) comprises absorbing $CO_2$ from said uncondensed $CO_2$-lean fraction using a circulating liquid solvent, wherein said absorbing produces a $CO_2$-rich off-gas stream, wherein said recovering of step (b) comprises compressing and/or cooling at least a portion of said recovered $CO_2$-rich off-gas stream to thereby provide said $CO_2$-rich liquid stream.

13. The process of claim 12, wherein said circulating liquid solvent is selected from a group consisting of methanol, SELEXOL solvent (DEPG), PURISOL solvent (NMP), MORPHYSORB solvent (NFM and NAM), Sulfinol solvent (Solfolane and di-isopropanolamine or Solfolane and methyldiethanolamine), reversible ionic liquids, propylene carbonate, hot potassium carbonate, amines, chilled ammonia, ammonium carbonate, and combinations thereof.

14. The process of claim 1, wherein said recovering of step (b) comprises freezing $CO_2$ from said uncondensed $CO_2$-lean fraction to thereby provide a plurality of $CO_2$ solids and melting at least a portion of said $CO_2$ solids to thereby provide said $CO_2$-rich liquid stream.

15. The process of claim 1, further comprising, prior to said cooling of step (a), passing at least a portion of said high-pressure gas stream through at least one membrane separation device to thereby provide a first permeate stream and a first $CO_2$-enriched non-permeate stream, wherein said high-pressure feed gas stream at least partially condensed in step (a) comprises at least a portion of said first $CO_2$-enriched non-permeate stream.

16. A method of recovering carbon dioxide ($CO_2$) in a liquid state from a high-pressure gas stream, said method comprising:

(a) cooling and partially condensing a high-pressure feed gas stream to thereby provide a condensed $CO_2$-rich fraction and an uncondensed $CO_2$-lean fraction;

(b) recovering a $CO_2$-rich liquid stream from at least a portion of said uncondensed $CO_2$-lean fraction, wherein said recovering comprises one or more of the following steps—

(i) absorbing $CO_2$ from said uncondensed $CO_2$-lean fraction using a circulating liquid solvent to thereby provide a $CO_2$-rich off-gas stream, wherein said recovering further comprises compressing and/or cooling at least a portion of said recovered $CO_2$-rich off-gas stream to thereby provide said $CO_2$-rich liquid stream, and/or (ii) adsorbing $CO_2$ from said uncondensed $CO_2$-lean fraction using a solid adsorbent material to thereby provide a $CO_2$-rich tail gas stream, wherein said $CO_2$-rich liquid stream recovered comprises at least a portion of said $CO_2$-rich tail gas stream, and/or (iii) freezing $CO_2$ from said uncondensed $CO_2$-lean fraction using one or more direct or indirect heat exchange methods to thereby provide a plurality of $CO_2$ solids and melting at least a portion of said $CO_2$ solids to thereby provide said $CO_2$-rich liquid stream;

(c) introducing at least a portion of said $CO_2$-rich liquid stream recovered in step (b) and/or at least a portion of said condensed $CO_2$-rich fraction resulting from said cooling and partially condensing of step (a) into a purification zone; and (d) separating at least a portion of the non-$CO_2$ components from said $CO_2$-rich liquid stream and/or said condensed $CO_2$-rich fraction introduced into said purification zone to thereby provide a purified $CO_2$-rich liquid stream, wherein each of said high-pressure feed gas stream, said condensed $CO_2$-rich fraction, and said purified $CO_2$-rich liquid stream has a pressure greater than 77 psia.

17. The process of claim 16, wherein said high-pressure feed gas stream comprises a natural gas or a synthesis gas stream.

18. The process of claim 16, wherein said purified $CO_2$ liquid stream comprises at least 75 percent of the $CO_2$ originally present in said high-pressure feed gas stream.

19. The process of claim 16, wherein not more than 90 percent of the $CO_2$ present in said purified $CO_2$-rich liquid stream was subjected to compression during said recovering of step (b).

20. The process of claim 16, wherein said high-pressure feed gas stream has a pressure of at least 350 psia and comprises at least 20 mole percent $CO_2$ prior to said cooling of step (a), wherein said high-pressure feed gas stream has been pre-treated for the removal of non-methane hydrocarbons, sulfur-containing compounds, and water prior to said cooling of step (a).

21. The process of claim 16, wherein said recovering of step (b) comprises adsorbing $CO_2$ from said uncondensed $CO_2$-lean fraction, wherein said $CO_2$-rich liquid stream recovered in step (b) has a pressure of at least 77 psia.

22. The process of claim 16, wherein said recovering of step (b) comprises absorbing $CO_2$ from said uncondensed $CO_2$-lean fraction wherein said $CO_2$-rich liquid stream has a pressure of at least 77 psia, wherein said circulating liquid solvent is selected from a group consisting of methanol, SELEXOL solvent (DEPG), PURISOL solvent (NMP), MORPHYSORB solvent (NFM and NAM), Sulfinol solvent (Solfolane and di-isopropanolamine or Solfolane and methyldiethanolamine), Flexsorb SE solvent (Solfolane and sterically-hindered amine), reversible ionic liquids, propylene carbonate, hot potassium carbonate, amines, chilled ammonia, ammonium carbonate, and combinations thereof.

23. The process of claim 16, wherein said recovering of step (b) comprises freezing said $CO_2$ from said uncondensed $CO_2$-lean fraction, wherein said $CO_2$-rich liquid stream has a pressure of at least 77 psia.

24. The process of claim 16, further comprising, prior to said cooling of step (a), passing at least a portion of said high-pressure gas stream through at least one membrane separation device to thereby provide a first permeate stream and a first $CO_2$-enriched non-permeate stream, wherein said high-pressure feed gas stream at least partially condensed in step (a) comprises at least a portion of said first $CO_2$-enriched non-permeate stream.

25. A method of recovering carbon dioxide ($CO_2$) in a liquid state from a high-pressure gas stream, said method comprising:

(a) cooling and partially condensing a high-pressure feed gas stream to thereby provide a condensed $CO_2$-rich fraction and an uncondensed $CO_2$-lean fraction;

(b) passing at least a portion of said uncondensed $CO_2$-lean fraction though at least one membrane separation device to thereby provide a second permeate stream and a second $CO_2$-enriched non-permeate stream (c) recovering a $CO_2$-rich liquid stream from at least a portion of said second $CO_2$-enriched non-permeate stream, wherein said recovering comprises one or more of the following steps—

(i) absorbing $CO_2$ from said uncondensed $CO_2$-lean fraction, and/or (ii) adsorbing $CO_2$ from said uncondensed $CO_2$-lean fraction, and/or (iii) freezing $CO_2$ from said uncondensed $CO_2$-lean fraction;

(d) introducing at least a portion of said $CO_2$-rich liquid stream recovered in step (d) and/or at least a portion of said condensed $CO_2$-rich fraction resulting from said cooling and partially condensing of step (a) into a purification zone; and (e) separating at least a portion of the non-$CO_2$ components from said $CO_2$-rich liquid stream and/or said condensed $CO_2$-rich fraction introduced into said purification zone to thereby provide a purified $CO_2$-rich liquid stream, wherein each of said high-pressure feed gas stream, said condensed $CO_2$-rich fraction, and said purified $CO_2$-rich liquid stream has a pressure greater than 77 psia.

* * * * *